US012673591B2

(12) United States Patent
Wilckens et al.

(10) Patent No.: US 12,673,591 B2
(45) Date of Patent: Jul. 7, 2026

(54) MODULAR VEHICLE SEAT AND PLATFORM ASSEMBLIES

(71) Applicant: Nivel Parts & Manufacturing Co., LLC, Jacksonville, FL (US)

(72) Inventors: Blake H. Wilckens, Tallahassee, FL (US); Jeffrey L. Nabors, Tallahassee, FL (US); Matthew Brian Fields, Yulee, FL (US); Zachary T. Cantrell, Jacksonville, FL (US); Aric L. Singletary, Yulee, FL (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 254 days.

(21) Appl. No.: 18/372,892

(22) Filed: Sep. 26, 2023

(65) Prior Publication Data

US 2024/0109463 A1 Apr. 4, 2024

Related U.S. Application Data

(60) Provisional application No. 63/411,834, filed on Sep. 30, 2022.

(51) Int. Cl.
*B60N 2/30* (2006.01)

(52) U.S. Cl.
CPC ......... *B60N 2/3097* (2013.01); *B60N 2/3045* (2013.01)

(58) Field of Classification Search
CPC .. B60N 2002/0216; B60N 2/30; B60N 2/304; B60N 2/3097; B60N 2/305; B60N 2/3045; B60N 2/3038; A47C 7/60; A47C 7/56

USPC ..................................... 297/335, 331, 411.32
See application file for complete search history.

(56) References Cited

U.S. PATENT DOCUMENTS

| | | | |
|---|---|---|---|
| 738,624 A | 9/1903 | Mcnulty | |
| 937,595 A * | 10/1909 | Graves et al. ......... | B60N 2/305 297/335 |
| 4,460,215 A * | 7/1984 | Chamberlain ........... | A47C 9/06 297/14 |
| 4,953,259 A * | 9/1990 | Frye ....................... | B60N 2/847 16/337 |
| 5,116,097 A | 5/1992 | Bulgari | |
| 5,511,853 A | 4/1996 | Wallis | |
| 5,662,377 A | 9/1997 | Holdampf et al. | |
| 5,711,505 A | 1/1998 | Nemoto | |
| 6,161,899 A | 12/2000 | Yu | |
| 6,290,297 B1 | 9/2001 | Yu | |
| 7,303,235 B1 | 12/2007 | Fongers | |
| 7,909,382 B2 | 3/2011 | Kanamori et al. | |

(Continued)

*Primary Examiner* — Milton Nelson, Jr.
(74) *Attorney, Agent, or Firm* — Barnes & Thornburg LLP

(57) ABSTRACT

A modular seat assembly includes a seat frame, a seat assembly, and a mounting assembly. The seat frame is operable to be attached to the vehicle and includes a seat support platform. The seat assembly is arranged on the seat frame and includes a seat back and a seat bottom. The mounting assembly includes a support member coupled to the seat support platform adjacent to an inner side of the seat platform and a protrusion extending away from a lateral side of the seat bottom. The seat bottom is coupled to and is pivotable about the support member between a raised arrangement and a lowered arrangement, and the support member includes a resilient recess operable to receive the protrusion when the seat bottom is in the raised arrangement so as to retain the seat bottom in the raised arrangement.

19 Claims, 27 Drawing Sheets

(56) References Cited

U.S. PATENT DOCUMENTS

| | | | |
|---|---|---|---|
| 8,479,854 B1 | 7/2013 | Gagnon | |
| 9,889,777 B2 | 2/2018 | Proulx et al. | |
| 10,434,912 B2 * | 10/2019 | Zapf | B60N 2/753 |
| 10,618,404 B2 | 4/2020 | Laberge et al. | |
| 11,110,977 B2 | 9/2021 | Schultz et al. | |
| 2005/0006920 A1 | 1/2005 | Moriyama et al. | |
| 2005/0146188 A1 | 7/2005 | Nichilo | |
| 2017/0334485 A1 | 11/2017 | Leonard et al. | |
| 2020/0324817 A1 | 10/2020 | Hammond, Jr. et al. | |
| 2021/0347219 A1 | 11/2021 | Wood et al. | |

* cited by examiner

MODULAR VEHICLE SEAT AND PLATFORM ASSEMBLIES

CROSS-REFERENCE TO RELATED APPLICATIONS

This non-provisional application claims the benefit and priority, under 35 U.S.C. § 119(e) and any other applicable laws and statutes, to U.S. Provisional Application Ser. No. 63/411,834 filed on Sep. 30, 2022, the entire disclosure of which is incorporated herein by reference.

BACKGROUND

The present disclosure relates to vehicular seating arrangements and assemblies, in particular modular vehicle seats and vehicle platforms movable between various arrangements on the vehicle.

SUMMARY

According to a first aspect of the present disclosure, a modular seat assembly for attachment to a vehicle includes a seat frame operable to be attached to the vehicle, the seat frame including a seat support platform, at least one seat assembly arranged on the seat frame, and a first mounting assembly. The at least one seat assembly includes a seat back coupled to the seat frame and a seat bottom pivotably coupled to the seat support platform. The first mounting assembly includes a first support member coupled to the seat support platform adjacent to an inner side of the seat platform and a first protrusion extending away from a first lateral side of the seat bottom. In some embodiments, the seat bottom is coupled to and is pivotable about the first support member between a raised arrangement and a lowered arrangement, and the first support member includes a first resilient recess operable to receive the first protrusion when the seat bottom is in the raised arrangement so as to retain the seat bottom in the raised arrangement.

In some embodiments, the modular seat assembly further includes a second mounting assembly including a second support member spaced apart from the first support member and coupled to the seat support platform adjacent to the inner side of the seat support platform. The first support member is arranged adjacent to the first lateral side of the seat bottom, and wherein the second support member is arranged adjacent to a second lateral side of the seat bottom opposite the first lateral side.

In some embodiments, the second mounting assembly further includes a second protrusion extending away from the second lateral side of the seat bottom, and the second support member includes a second resilient recess operable to receive the second protrusion when the seat bottom is in the raised arrangement so as to retain the seat bottom in the raised arrangement. In some embodiments, the first and second resilient recesses of the first and second support members are arranged on a bottom side of the first and second support members.

In some embodiments, the first and second resilient recesses are formed as U-shaped channels, and the U-shaped channels are formed between a free end of the first and second support member, respectively, and an inwardly-facing side of a main body portion of the first and second support members, respectively. In some embodiments, in the raised arrangement in which the first and second protrusions are arranged in the first and second resilient recesses, respectively, the free end of the first and second support members are flexed slightly away from the main body portions by the first and second protrusions while maintaining pressure on the first and second protrusions such that the first and second protrusion are securely arranged in the first and second resilient recesses, respectively.

In some embodiments, the modular seat assembly further includes a first coupling protrusion extending away from the first lateral side of the seat bottom and a second coupling protrusion extending away from the second lateral side of the seat bottom. The first support member includes a first opening formed therethrough, the second support member includes a second opening formed therethrough, the first coupling protrusion is arranged within the first opening and the second coupling protrusion is arranged within the second opening, the first and second openings define a pivot axis of the seat bottom, and the first and second coupling protrusions are rotatably movable within the first and second openings such that the seat bottom is operable to freely pivot about the pivot axis.

In some embodiments, the first protrusion is spaced apart from the first coupling protrusion on the first lateral side of the seat bottom, the second protrusion is spaced apart from the second coupling protrusion on the second lateral side of the seat bottom, the first and second protrusions are arranged on the first and second lateral sides radially outwardly of the pivot axis such that the first and second protrusions travel along first and second circumferential paths about the pivot axis in response to the seat bottom moving between the raised and lowered arrangements.

In some embodiments, the seat support platform includes a seat support surface and a lower support surface opposite the seat support surface, and the lower support frame is coupled to and depends downwardly away from the lower support surface of the seat support platform. In some embodiments, in the raised arrangement, the seat bottom is raised toward the seat back, and, in the lowered arrangement, the seat bottom is substantially parallel with the seat support platform. In some embodiments, the U-shaped channels of the first and second resilient recesses generally match an outer contour of the first and second protrusions, respectively.

According to a further aspect of the present disclosure, a modular seat assembly for attachment to a vehicle includes a seat frame operable to be attached to the vehicle, the seat frame including a seat support platform, at least one seat assembly arranged on the seat frame, and a first mounting assembly. The at least one seat assembly includes a seat back coupled to the seat frame and a seat bottom pivotably coupled to the seat support platform. The first mounting assembly includes a first support member coupled to the seat support platform adjacent to an inner side of the seat platform and a first protrusion extending away from a first lateral side of the seat bottom. The seat bottom is coupled to and is pivotable about the first support member between a raised arrangement and a lowered arrangement, and the first support member includes a first resilient flexible catch operable to receive the first protrusion when the seat bottom is in the lowered arrangement so as to retain the seat bottom in the lowered arrangement.

In some embodiments, the modular seat assembly further includes a second mounting assembly including a second support member spaced apart from the first support member and coupled to the seat support platform adjacent to the inner side of the seat support platform. The first support member is arranged adjacent to the first lateral side of the seat bottom, and the second support member is arranged adjacent to a second lateral side of the seat bottom opposite the first lateral side.

In some embodiments, the second mounting assembly further includes a second protrusion extending away from the second lateral side of the seat bottom, and the second support member includes a second resilient flexible catch operable to receive the second protrusion when the seat bottom is in the raised arrangement so as to retain the seat bottom in the raised arrangement. In some embodiments, the first resilient flexible catch of the first support member is arranged on a top side of the first support member.

In some embodiments, the first resilient flexible catch includes a base end and a free end, the base end is rigidly coupled to a main body portion of the first support member adjacent to the top side such that the first resilient flexible catch extends away from the main body portion and forms a U-shaped channel between the main body portion and the free end.

In some embodiments, in the lowered arrangement in which the first protrusion is arranged in the U-shaped channel formed by the first resilient flexible catch, and the free end of the first resilient flexible catch is flexed slightly away from main body portion by the first protrusion while maintaining pressure on the first protrusion such that the first protrusion is securely arranged in the U-shaped channel.

In some embodiments, the second resilient flexible catch of the second support member is arranged on a bottom side of the second support member. In some embodiments, the second resilient flexible catch includes a base end and a free end, and the base end is rigidly coupled to a main body portion of the second support member adjacent to the bottom side such that the second resilient flexible catch extends away from the main body portion and forms a U-shaped channel between the main body portion and the free end.

According to a further aspect of the present disclosure, a modular seat assembly for attachment to a vehicle includes a seat frame operable to be attached to the vehicle, the seat frame including a seat support platform, at least one seat assembly arranged on the seat frame, and a mounting assembly. The at least one seat assembly includes a seat back coupled to the seat frame and a seat bottom pivotably coupled to the seat support platform. The mounting assembly includes a first support member coupled to the seat support platform adjacent to an inner side of the seat platform and a first protrusion extending away from a first lateral side of the seat bottom. The seat bottom is coupled to and is pivotable about the first support member between a raised arrangement and a lowered arrangement, and the first support member includes a first resilient flexible catch configured to receive the first protrusion when the seat bottom is in the raised arrangement so as to retain the seat bottom in the raised arrangement and a second resilient flexible catch configured to receive the first protrusion when the seat bottom is in the lowered arrangement so as to retain the seat bottom in the lowered arrangement.

Additional features of the present disclosure will become apparent to those skilled in the art upon consideration of illustrative embodiments exemplifying the best mode of carrying out the disclosure as presently perceived.

Figure 1:
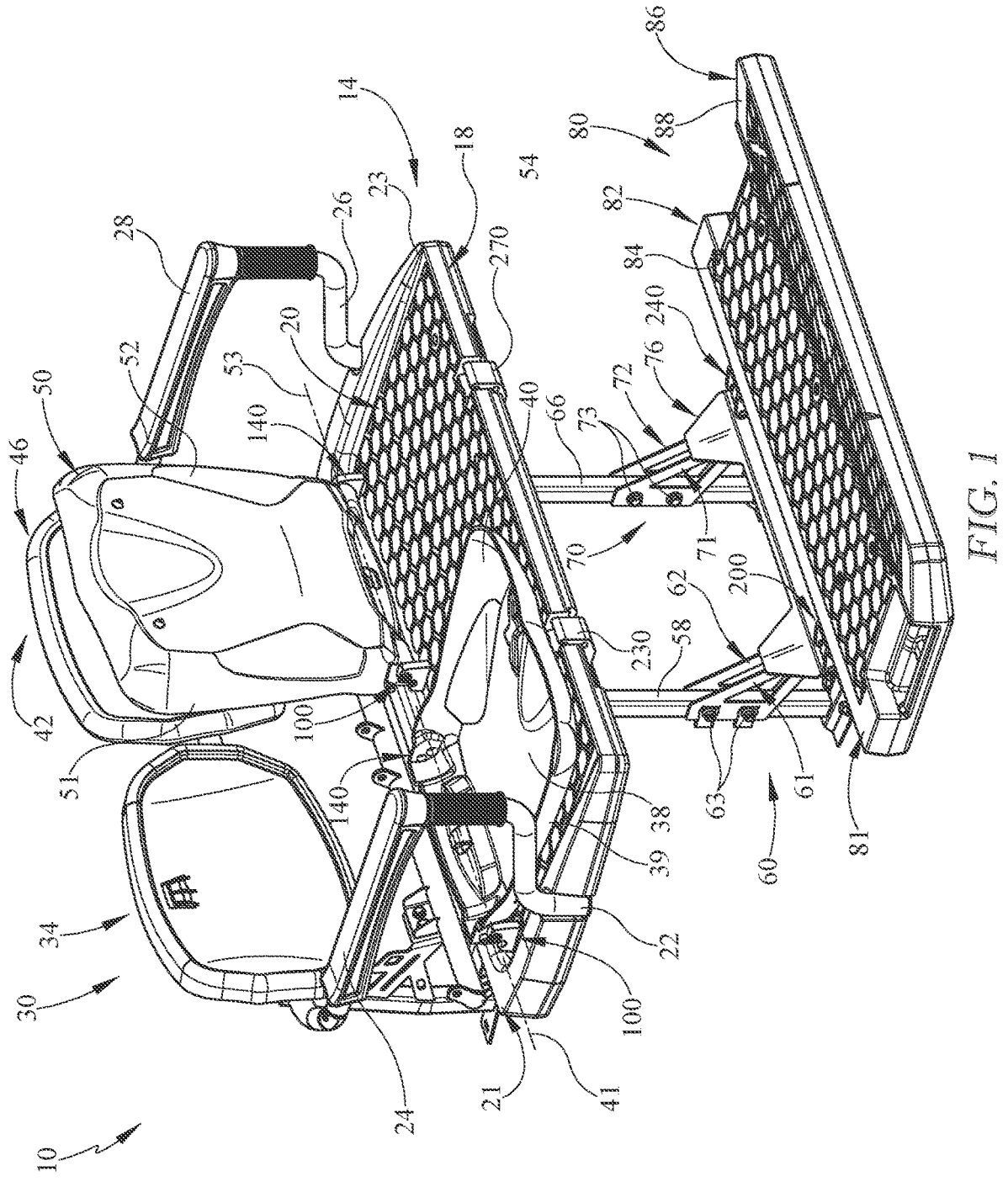
FIG. 1 is a perspective view of a modular seat assembly for attachment to a vehicle according to a first aspect of the present disclosure, showing a seat of the modular seat assembly held in a raised arrangement by a protrusion on the seat and a first resilient member, and showing a detachable platform in a first position on the seat assembly and in a lowered arrangement.
Figures 21A, 21B, 21C:
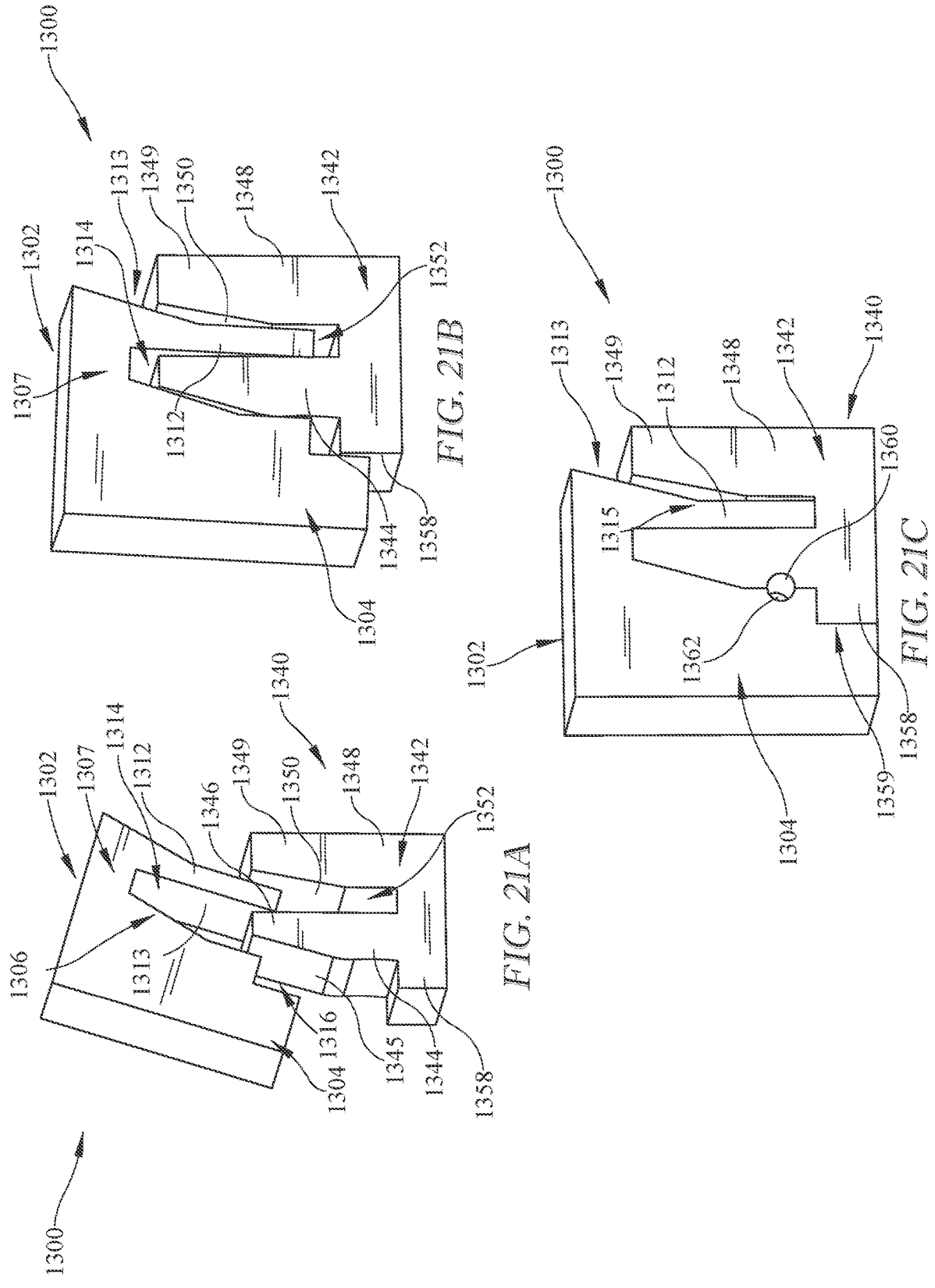
FIG. 21A is a side perspective view of a mounting member of the detachable platform operable to couple the detachable platform to a hook member arranged on the lower support frame of the modular seat assembly of FIG. 1 according to a further aspect of the present disclosure, showing the mounting member including two walls defining a first channel configured to receive a wall of the hook member so as to attach the mounting member to the hook member.
Figures 22A, 22B, 22C, 22D:
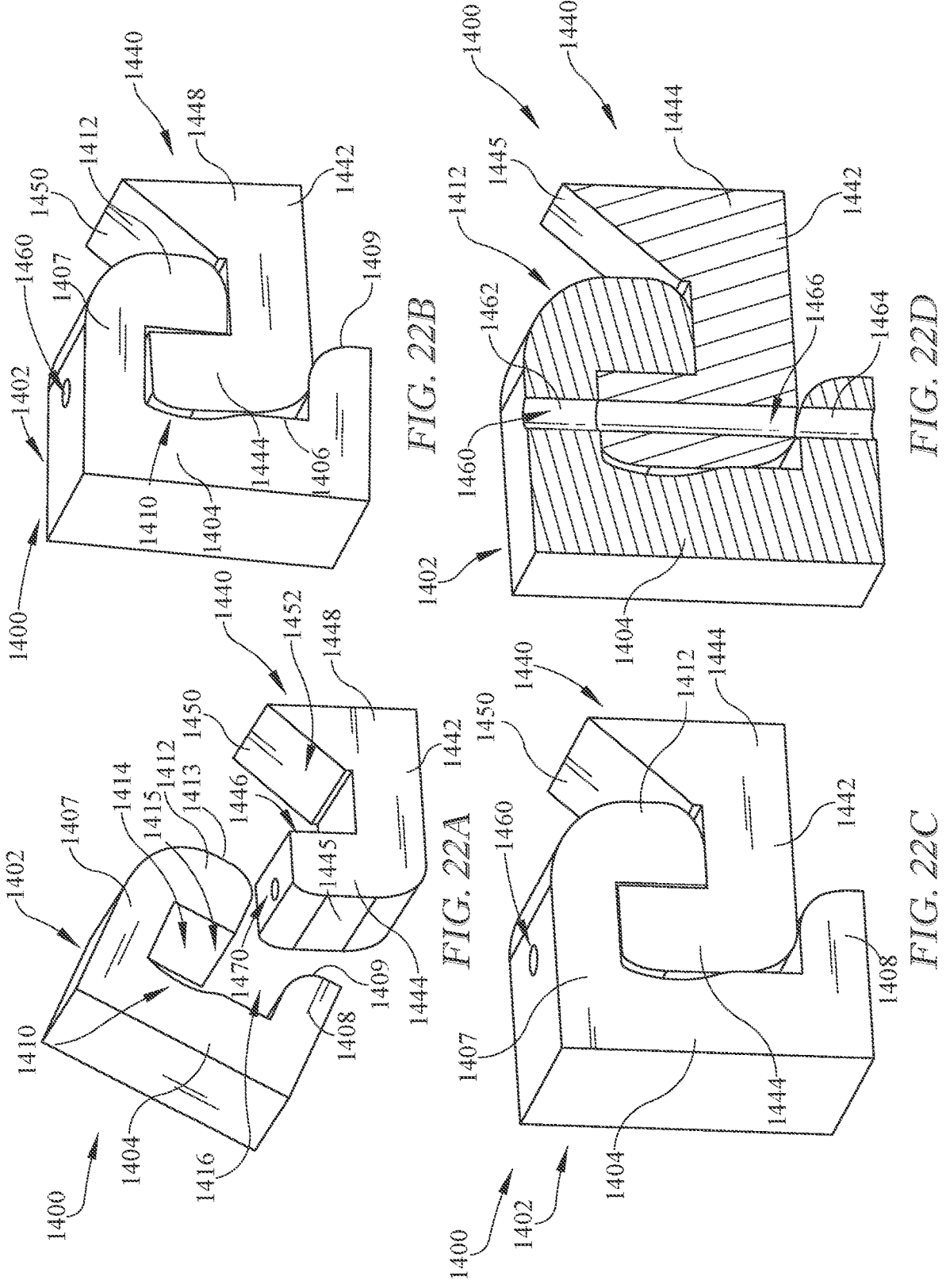
Figures 23A, 23B:
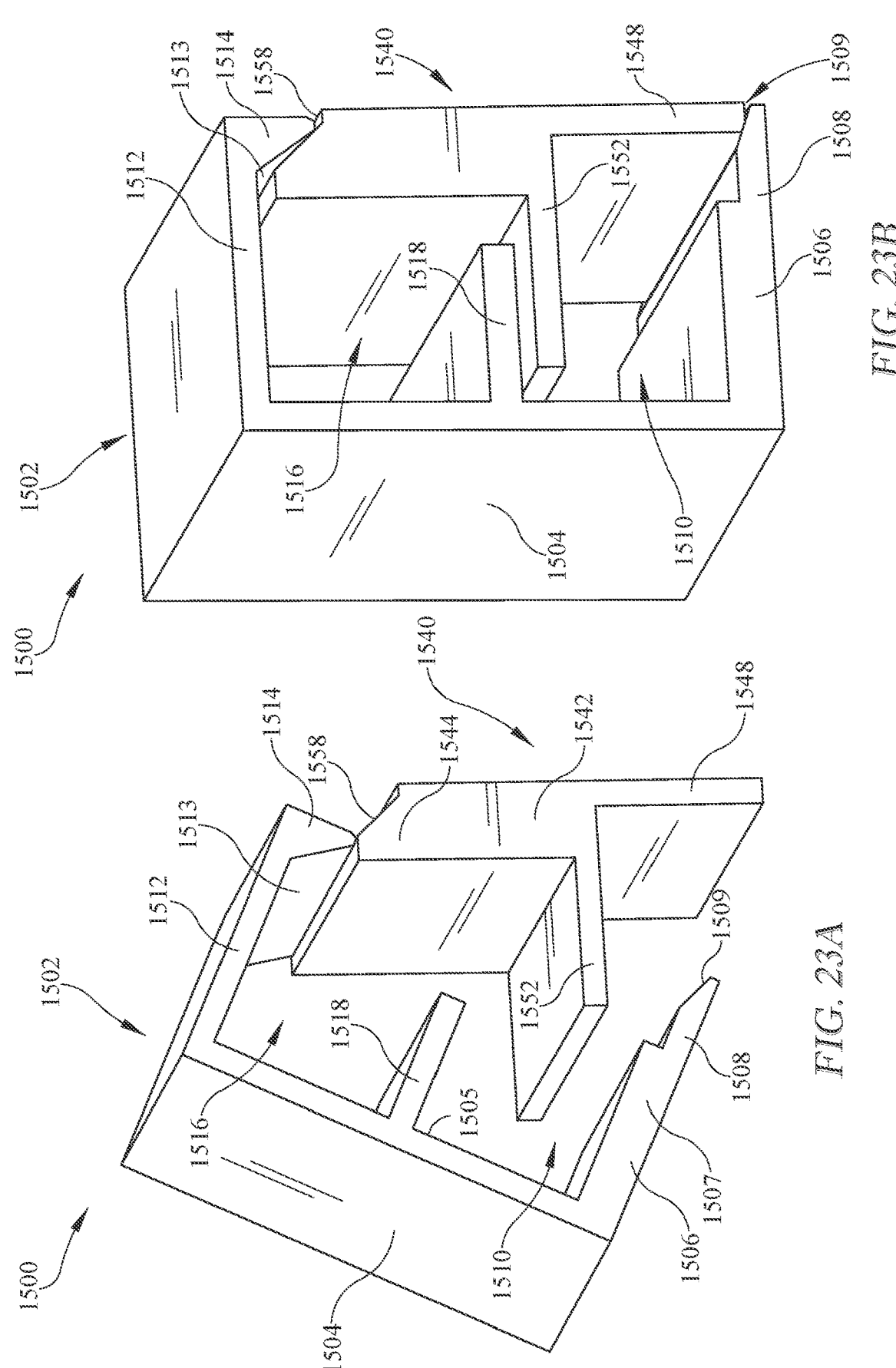

FIG. 21B is a side perspective view of the mounting member of the modular seat assembly of FIG. 21A, showing the mounting member being moved into attachment with the hook member;

FIG. 21C is a side perspective view of the mounting member of the modular seat assembly of FIG. 21A, showing the mounting member attached to the hook member in a mounted arrangement with a pin hole formed through the mounting member and the wall of the hook member;

FIG. 22A is a side perspective view of a mounting member of the detachable platform operable to couple the detachable platform to a hook member arranged on the lower support frame of the modular seat assembly of FIG. 1 according to a further aspect of the present disclosure, showing the mounting member including two walls defining a first channel configured to receive a wall of the hook member so as to attach the mounting member to the hook member;

FIG. 22B is a side perspective view of the mounting member of the modular seat assembly of FIG. 22A, showing the mounting member being moved into attachment with the hook member;

FIG. 22C is a side perspective view of the mounting member of the modular seat assembly of FIG. 22A, showing the mounting member attached to the hook member in a mounted arrangement with a pin hole formed through the mounting member and the wall of the hook member;

FIG. 22D is a side cross-sectional view of the mounting member of the modular seat assembly of FIG. 22A, showing the pin hole;

FIG. 23A is a side perspective view of a mounting member of the detachable platform operable to couple the detachable platform to a hook member arranged on the lower support frame of the modular seat assembly of FIG. 1 according to a further aspect of the present disclosure, showing the mounting member including multiple walls defining two cavities configured to receive a wall of the hook member and the hook member body so as to attach the mounting member to the hook member; and FIG. 23B is a side perspective view of the mounting member of the modular seat assembly of FIG. 23A, showing the mounting member in a mounted arrangement;

DETAILED DESCRIPTION

A modular seat assembly 10 according to a first aspect of the present disclosure includes two seat assemblies 30, 42 and a detachable platform assembly 80 and is adapted to be securely coupled to a vehicle 1600. The at least one seat assembly 30 and the detachable platform 80 may be arranged in various positions and arrangements on a seat frame 14 of the modular seat assembly 10 so as to provide secure storage of the seat bottoms 38, 50 and the detachable platform assembly 80 in a raised arrangement, as well as secure deployment of the seat bottoms 38, 50 and the detachable platform assembly 80 in a lowered arrangement. The modular seat assembly 10 further provides at least two positions for coupling the detachable platform assembly 80 to the seat frame 40, at least on a lower support frame 54 of the seat frame 14 and a seat support platform 18 of the seat frame 14.

Illustratively, FIG. 1 shows the modular seat assembly 10 including the seat frame 14 operable to be attached to the vehicle 1600. As shown in FIG. 1 and FIGS. 4-6, the seat frame 14 includes the seat support platform 18 and the lower support frame 54 coupled to and depending downwardly away from the seat support platform 18.

The seat frame 14 may include multiple support members operable to support the various components of the seat assembly 10, including a frame scaffold having a first seat assembly support 35 and a second seat assembly support 47. The frame 14 supports the seat support platform 18 thereon, the seat support platform 18 including a top surface 20 on which the first and second seat assemblies 30, 42 are arranged, as will be described in detail below. The seat support platform 18 has an inner side 21 and an outer side 23 located forward of the inner side 21, as shown in FIG. 1. As will be described in greater detail below, hook members 230, 270 of detachable platform mounting assemblies 200, 240 may be mounted on the outer side 23 of the seat support platform 18.

The seat frame 14 further includes a first armrest support bar 22 coupled to the seat support platform 18 and extending upwardly to support a first armrest 24. The seat frame 14 also includes a second armrest support bar 26 coupled to the seat support platform 18 and extending upwardly to support a second armrest 28.

The modular seat assembly 10 includes a first seat assembly 30 and a second seat assembly 42 arranged on the seat frame 14, as shown in FIGS. 1-3B. Illustratively, the first seat assembly 30 includes a seat back 34 arranged on the seat assembly support 35 and a seat bottom 38 pivotably arranged on the seat support platform 18. Specifically, the seat bottom 38 is pivotably supported by a first support member assembly 100 and a second support member assembly 140, also referred to as a first mounting assembly 100 and a second mounting assembly 140, which are each coupled to the seat support platform 18, each of which will be described in greater detail below. The first and second mounting assemblies 100, 140 each include an opening 117, 157. Two coupling protrusions 132, 172 extending away from opposing lateral sides 39, 40 of the seat bottom 38 extend into the openings 117, 157 such that the seat bottom 38 may pivot thereabout. The two coupling protrusions 132, 172 define a pivot axis 41 about which the seat bottom 38 pivots.

Similarly, the second seat assembly 42 includes a seat back 46 arranged on the seat assembly support 47 and a seat bottom 50 pivotably arranged on the seat support platform 18. Specifically, the seat bottom 50 is pivotably supported by an additional first mounting assembly 100 and an additional second mounting assembly 140 which are each coupled to the seat support platform 18. Two coupling protrusions 132, 172 extending away from opposing lateral sides 51, 52 of the seat bottom 50 extend into the openings 117, 157 such that the seat bottom 50 may pivot thereabout. The two coupling protrusions 132, 172 define a pivot axis 53 about which the seat bottom 50 pivots.

As shown in FIGS. 1-7, the seat assemblies 30, 42 are configured to be arranged in raised and lower arrangements. For example, FIG. 1 shows the first seat assembly 30 in a lowered arrangement and the second seat assembly 42 in a raised arrangement.

The seat frame 14 further includes the lower support frame 54, as shown in FIGS. 1-3B. The lower support frame 54 includes a first support member 58 coupled to and extending downwardly from an underside of the seat support platform 18 and a second support member 66 also coupled to and extending downwardly from an underside of the seat support platform 18. Illustratively, the first support member 58 and the second support member 66 are generally parallel to each other and extend the same distance away from the seat support platform 18.

The lower support frame 54 further includes a first support bracket 60 and a second support bracket 70 arranged on the first and second support members 58, 66, respectively. The first support bracket 60 includes first and second bracket plates 61, 62 coupled to opposing sides of the first support member 58 via fasteners 63. Illustratively, the first and second bracket plates 61, 62 are triangular so as to provide optimal support to a detachable platform support plate 76, as will be described in greater detail below. Similarly, the second support bracket 70 includes first and second bracket plates 71, 72 coupled to opposing sides of the second support member 66 via fasteners 73. Illustratively, the first and second bracket plates 71, 72 are also triangular.

Each of the first and second brackets 60, 70 extend from the first and second support members 58, 66 in an outward direction defined in a direction from an inner side 21 of the seat support platform 18 to an opposing outer side 23 of the seat support platform 18, as shown in FIGS. 1-7. The detachable platform support plate 76 is arranged on terminal ends of the first and second brackets 60, 70 and is generally parallel with seat support platform 18. The detachable platform support plate 76 includes a flat main surface 78. As will be described in greater detail below, the hook members 230, 270 of the detachable platform mounting assemblies 200, 240 may be mounted on the flat main surface 78.

Figure 2A:
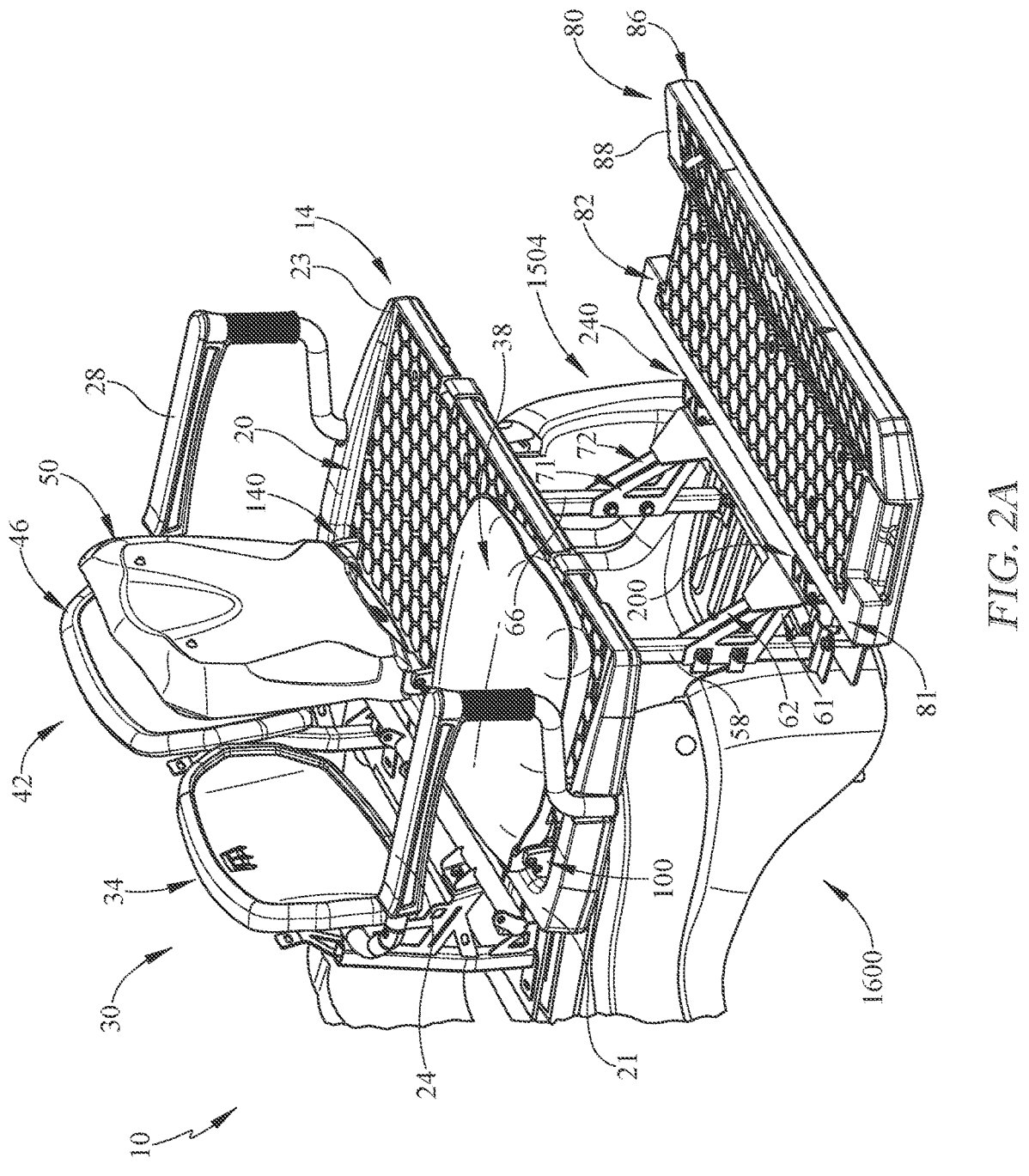
FIG. 2A is a perspective view of the modular seat assembly of FIG. 1, showing the modular seat assembly attached to a vehicle.
Figure 2B:
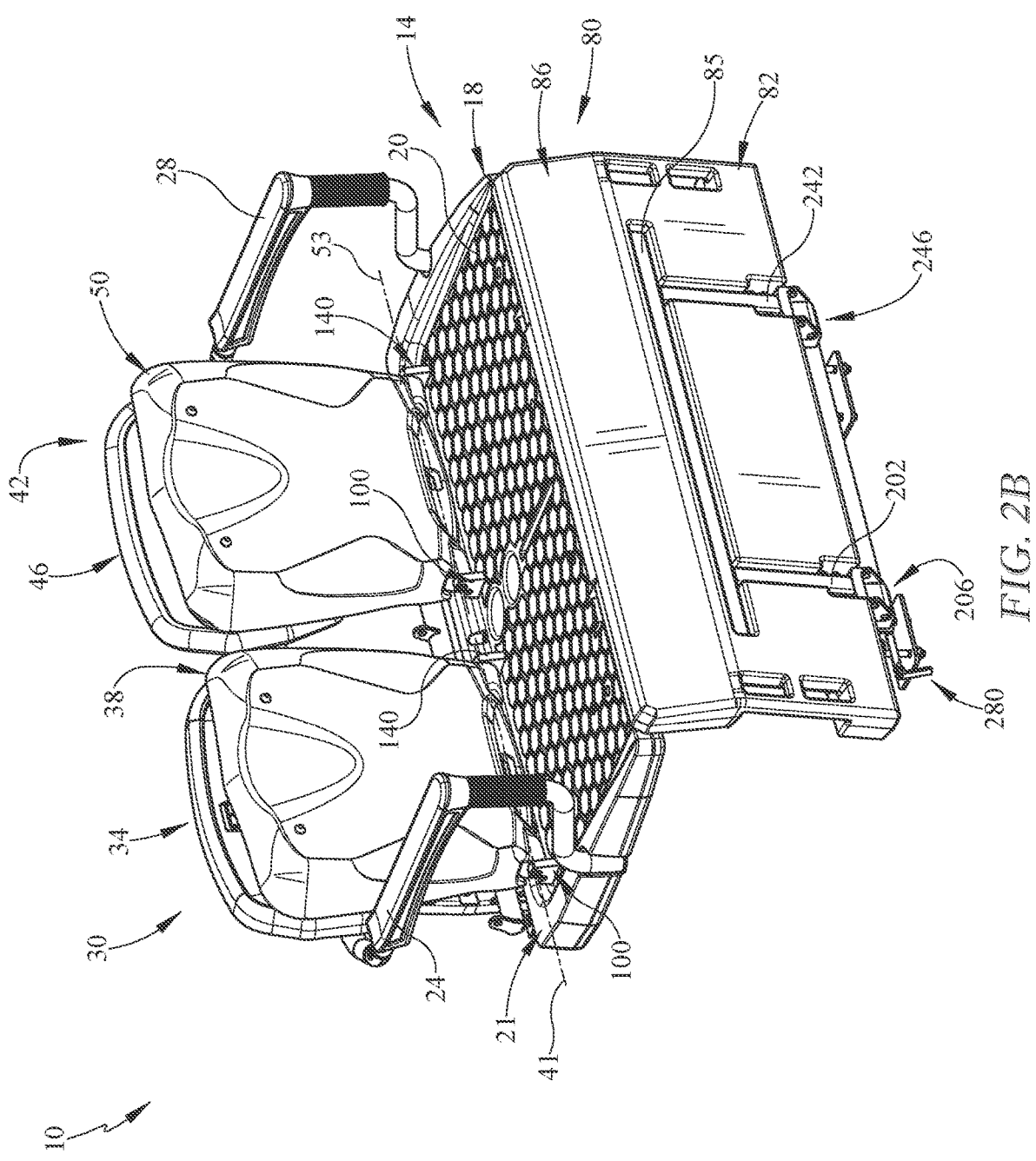
FIG. 2B is a perspective view of the modular seat assembly of FIG. 2A, showing two seats of the seat assembly in the raised arrangement and the detachable platform in the first position and in the raised arrangement.
Figure 3A:
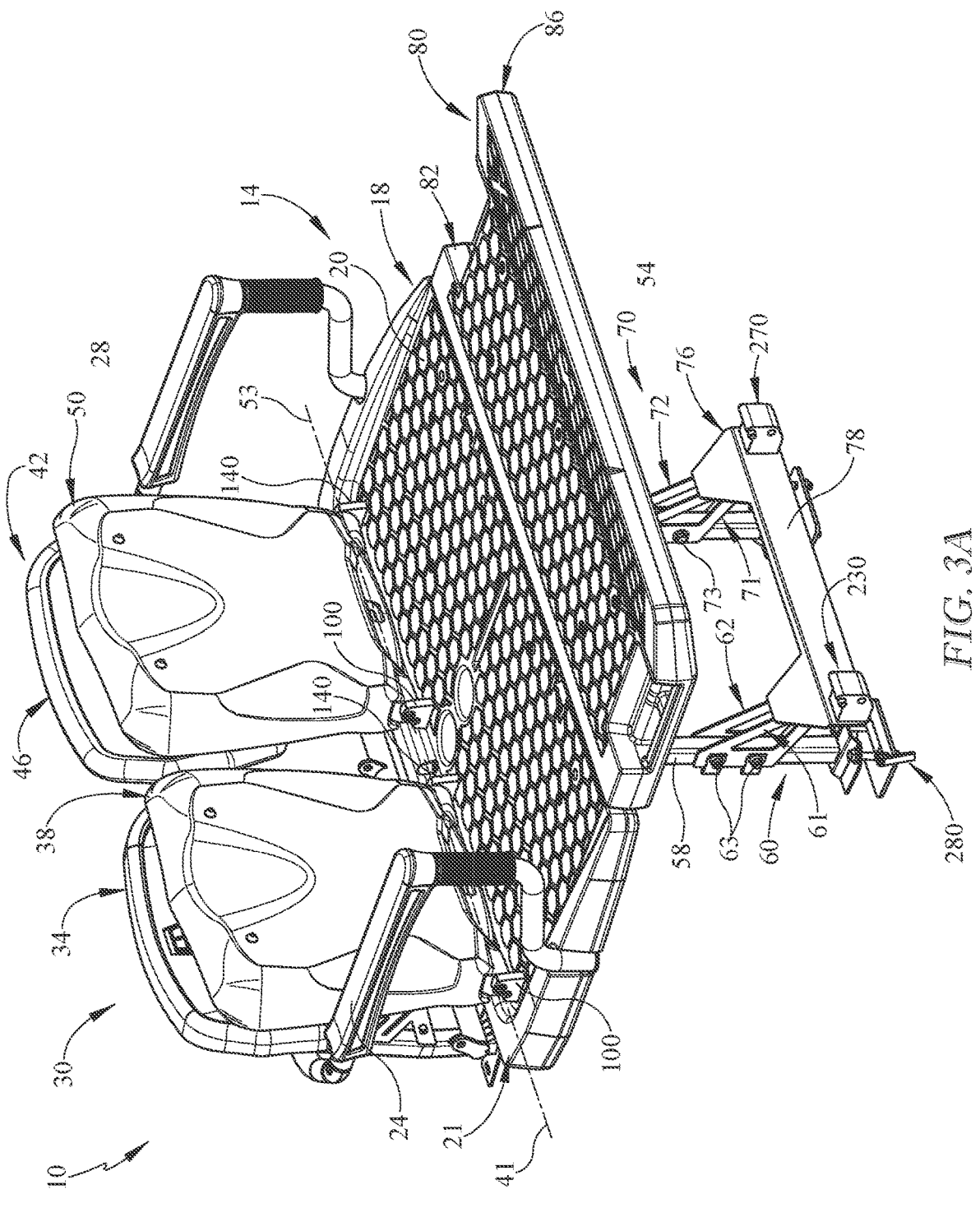
FIG. 3A is a perspective view of the modular seat assembly of FIG. 1, showing the seats of the two seat assembly in the raised arrangement, and showing the detachable platform in a second position on the seat assembly and in a lowered arrangement.
Figure 3B:
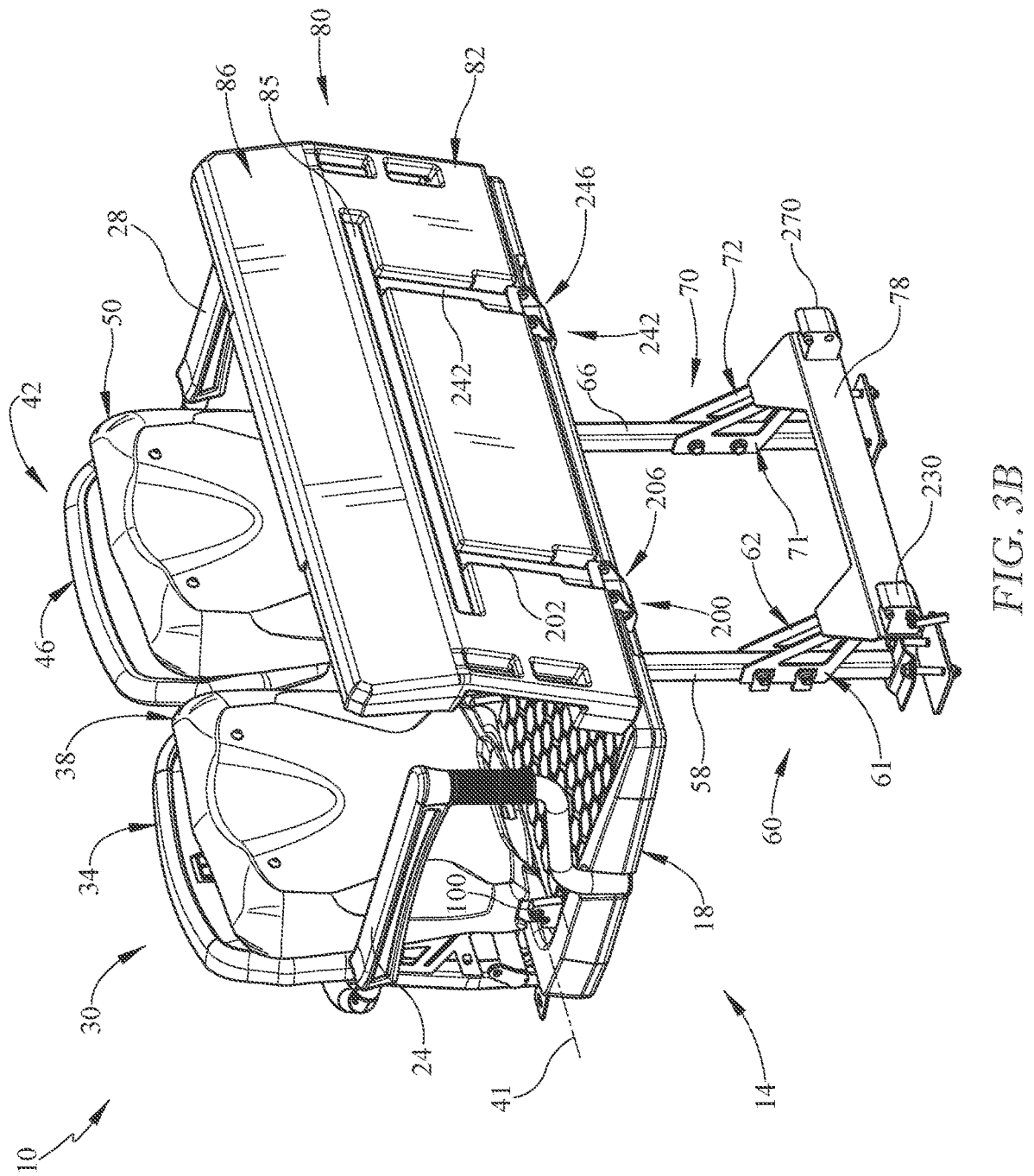
FIG. 3B is a perspective view of the modular seat assembly of FIG. 3A, showing the detachable platform in the second position on the seat assembly and in the raised arrangement.
Figure 4:
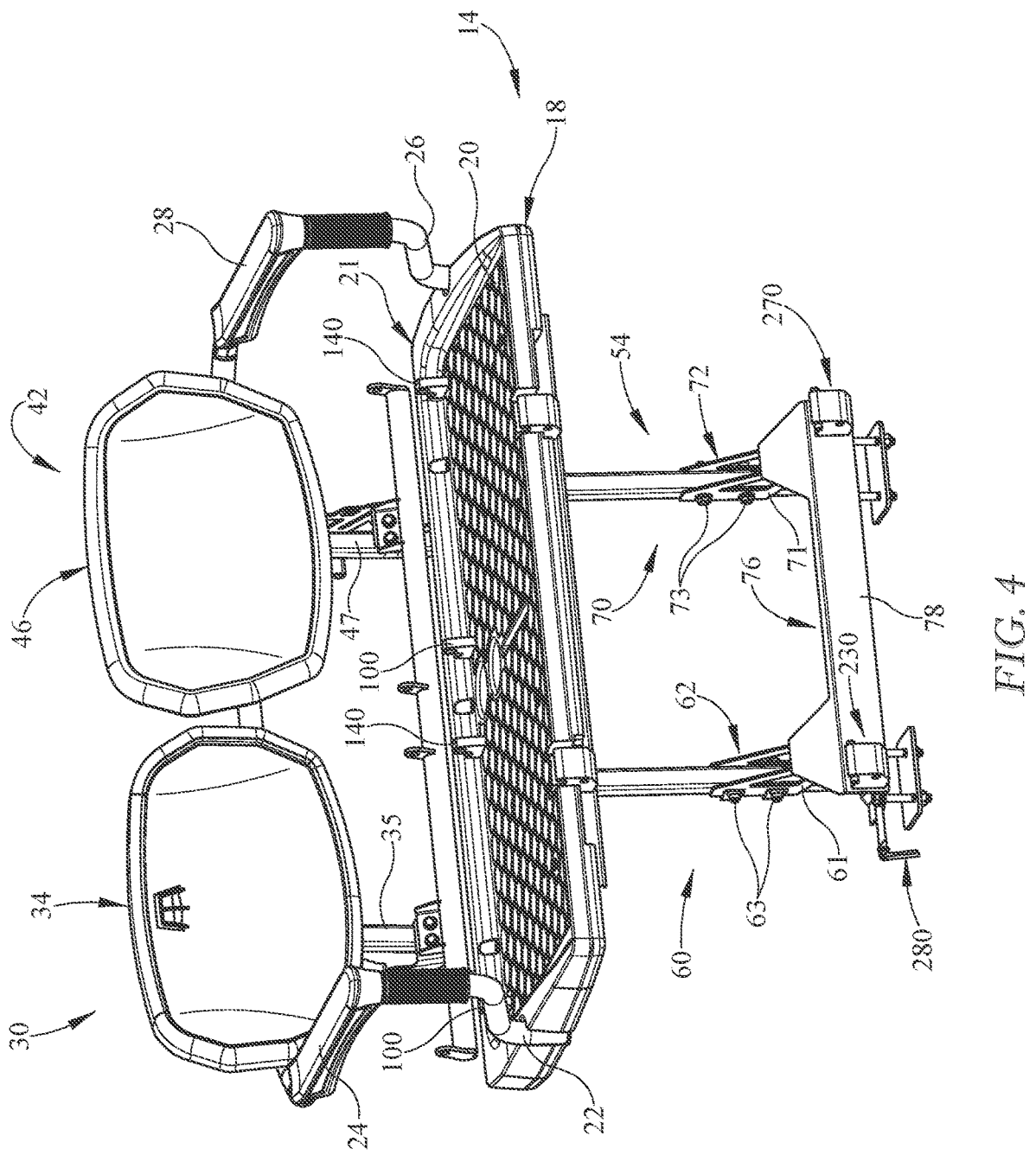
FIG. 4 is a front perspective view of the modular seat assembly of FIG. 1, showing the seat backs of the seats and a lower support frame of the seat assembly with the seat bottoms and detachable platform removed.
Figure 5:
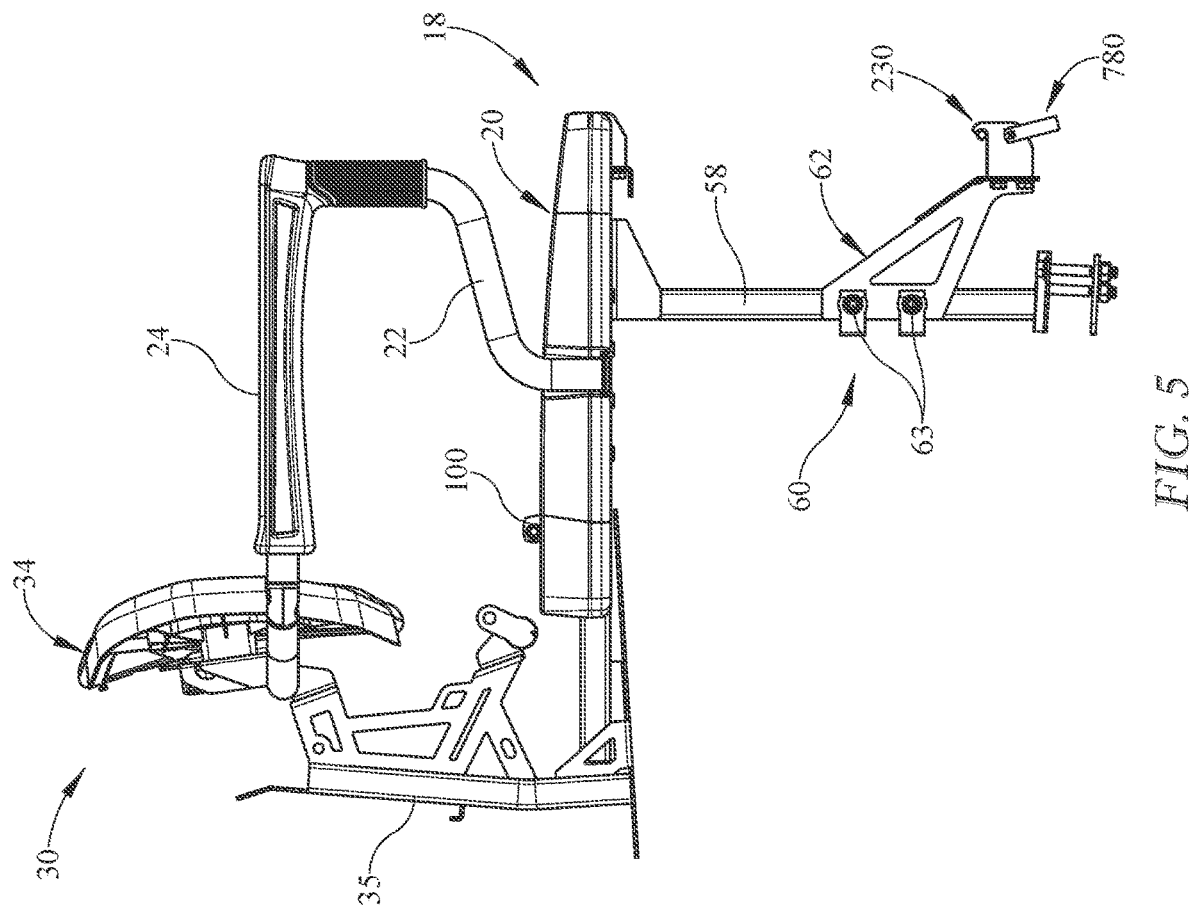
FIG. 5 is a side view of the modular seat assembly of FIG. 4.
Figure 6:
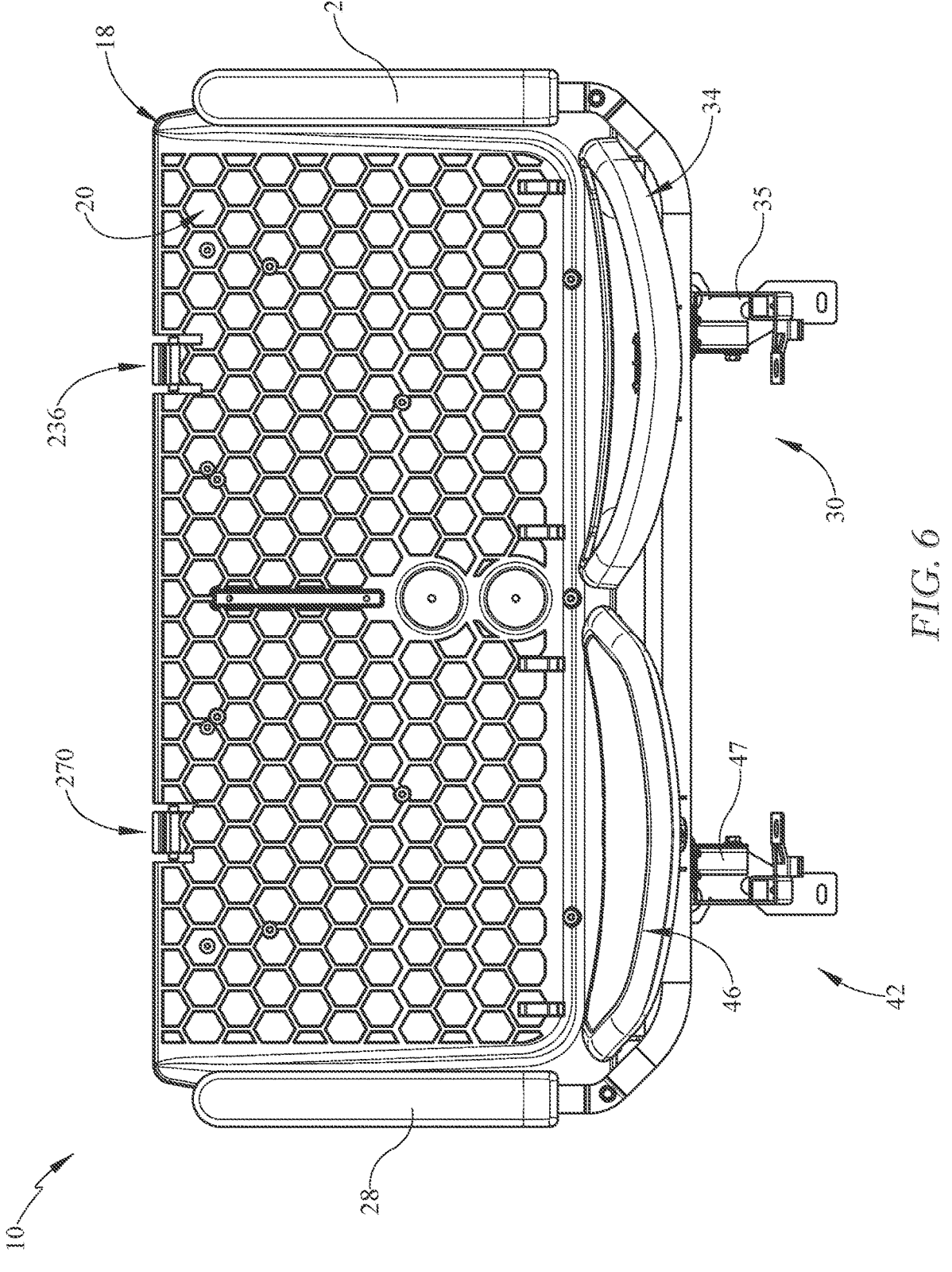
FIG. 6 is a top view of the modular seat assembly of FIG. 4.
Figure 7:
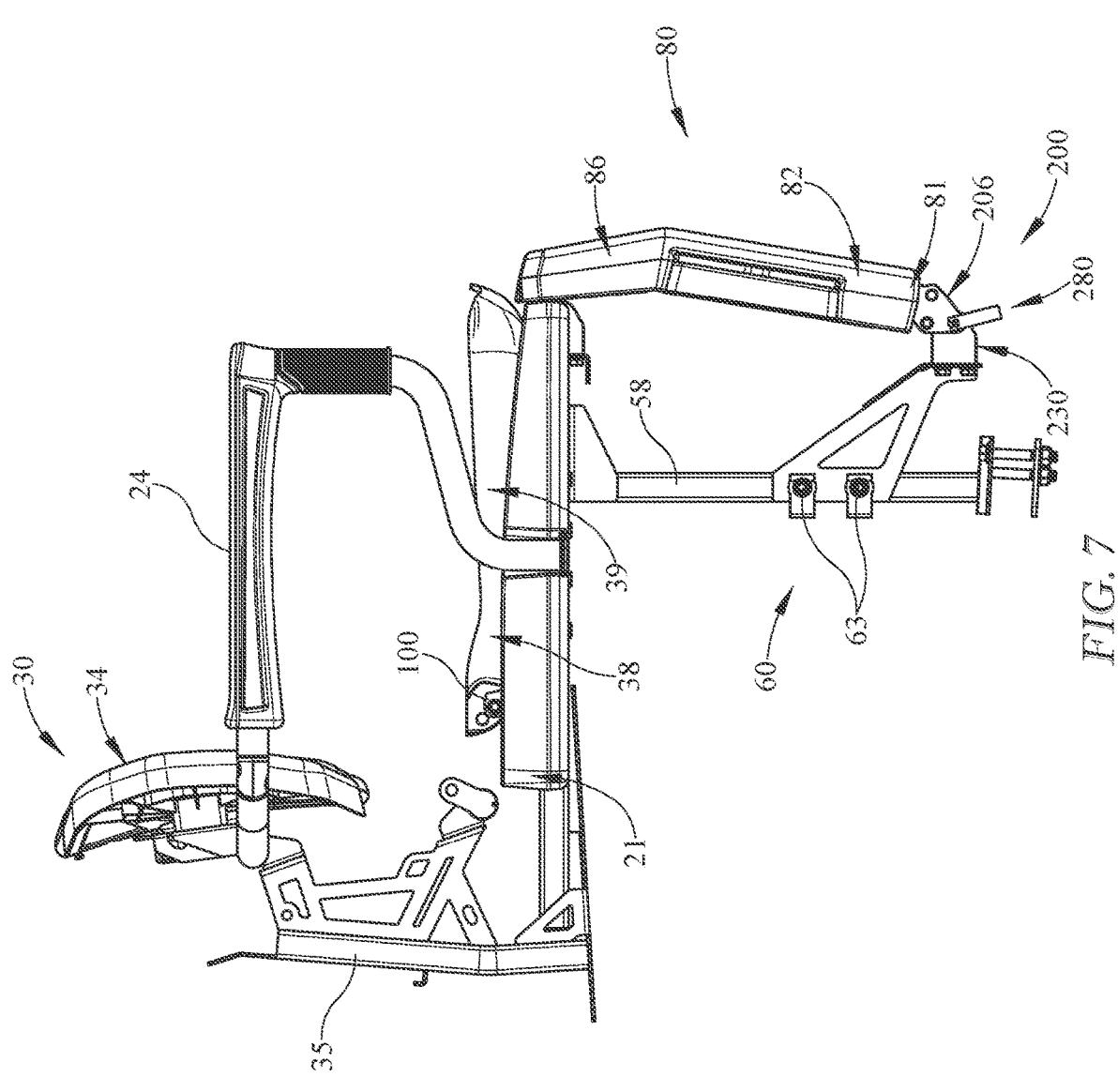
FIG. 7 is a side view of the modular seat assembly of FIG. 1, showing one seat in the lowered arrangement and showing the detachable platform in the first position and in the raised arrangement.

As shown in FIGS. 1-3B and 7, the detachable platform assembly 80 illustratively includes a main platform 82 having an upper surface 84 and an angled outer platform 86 having an upper surface 88. The main platform 82 and the angled outer platform 86 may define a surface providing various utilities to users of the modular seat assembly 10, such as a footrest and an area for storage. Moreover, when the assembly 80 is attached in the second position on the seat support platform 18, the assembly 80 may be folded upwardly into the raised arrangement, as shown in FIG. 3B, providing an outer wall for storage on the seat support platform 18.

FIG. 2 shows the modular seat assembly 10 securely coupled to a vehicle 1600. Illustratively, the modular seat assembly 10 may be coupled to a seat bed 1504 of a vehicle 1600, the vehicle 1600 being a golf cart or similar utility vehicle having a portion designated for modular seat coupling. A person skilled in the art will understand that the modular seat assembly 10 may be utilized in other vehicular and transportation applications. Moreover, a person skilled in the art will understand that the modular seat assembly 10 may be coupled to the vehicle via brackets, high-strength fasteners, and the like.

Figure 8A:
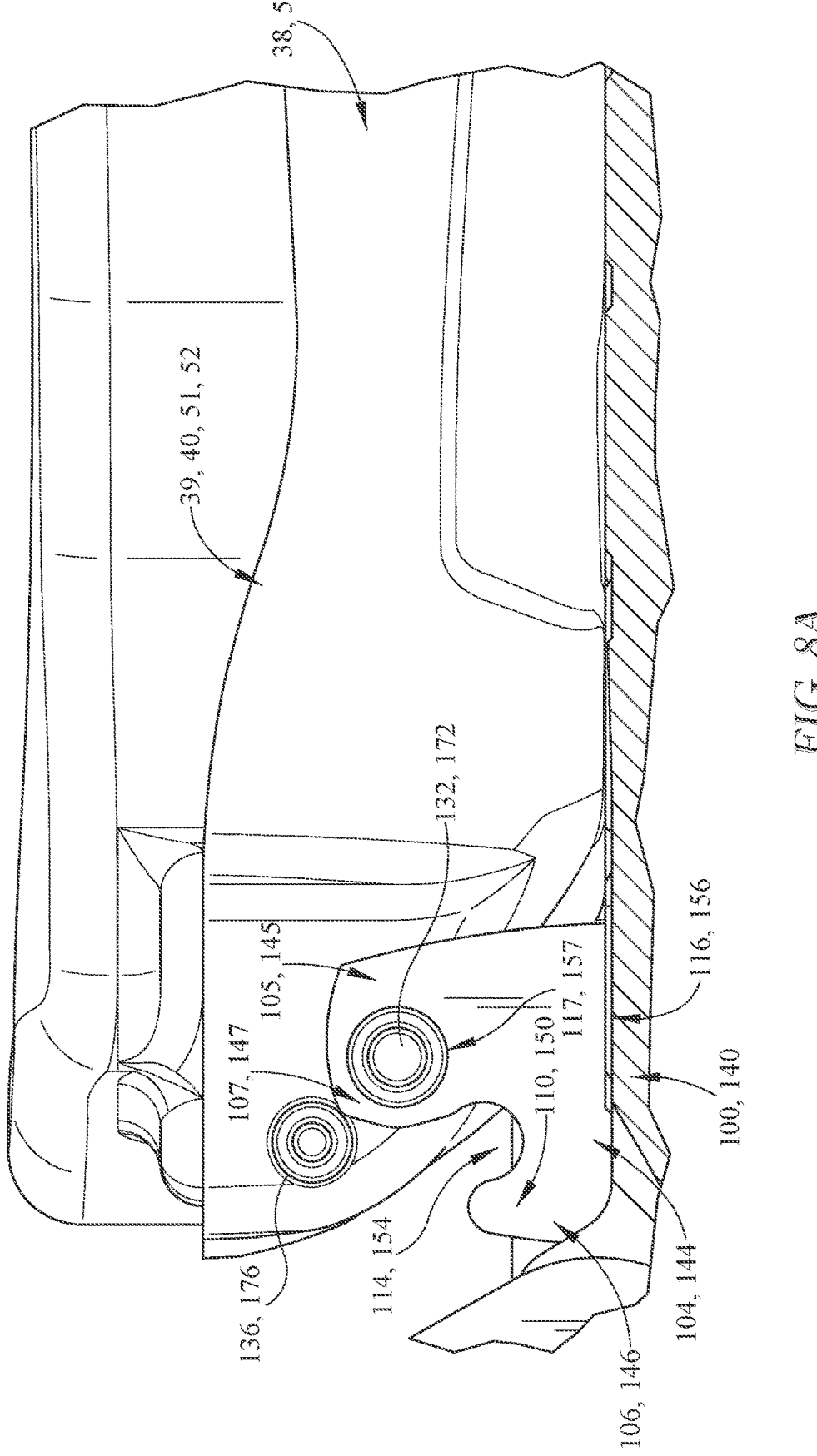
FIG. 8A is a side view of a support member operable to hold the seat bottom of the seat of the modular seat assembly of FIG. 1 in the raised arrangements, showing the seat bottom being in the lowered arrangement.
Figure 8B:
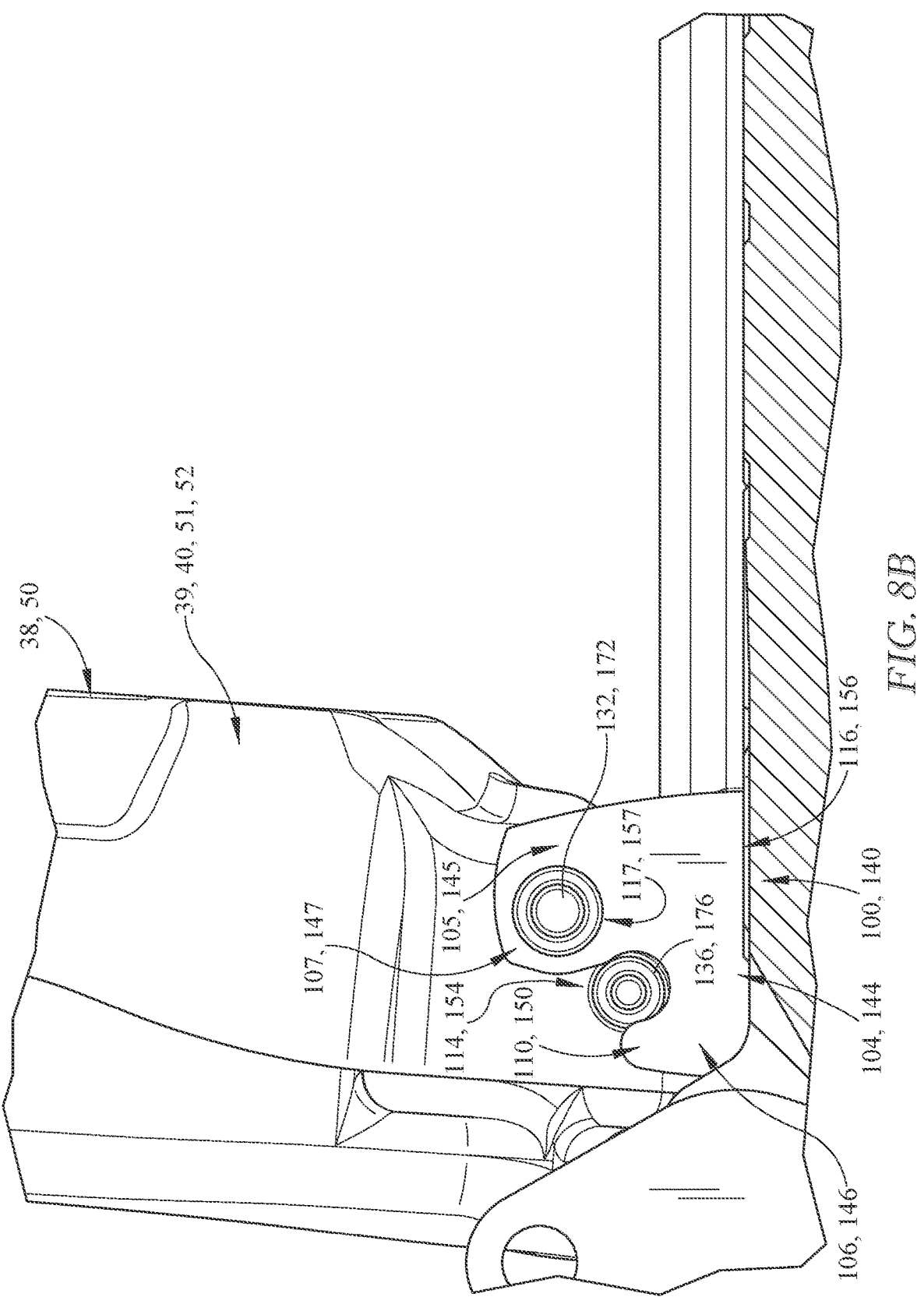
FIG. 8B is a side view of a support member of the modular seat assembly of FIG. 8A, showing the seat bottom being held in the raised arrangement.

In a first embodiment, the first mounting assembly 100 is illustratively arranged on the first lateral side 39 of the seat bottom 38 and the second mounting assembly 140 is illustratively arranged on the second lateral side 40 of the seat bottom 38, as shown in FIGS. 8A and 8B. The first and second mounting assemblies 100, 140 are formed the same, as can be seen in FIGS. 8A and 8B, which refers to both assemblies 100, 140 and their associated components in the single side view. As such, all references in the description of the first mounting assembly 100 are applicable to the second mounting assembly 140. In operation, in the raised arrangement, the seat bottom 38 is raised toward the seat back 34, and, in the lowered arrangement, the seat bottom 38 is substantially parallel with the seat support platform 18.

A person skilled in the art will understand that the mounting assemblies 100, 140 may be arranged in the opposite arrangement, with the first mounting assembly 100 on the second lateral side 40 and the second mounting assembly 140 on the first lateral side 39. Moreover, the first and second mounting assemblies 100, 140 may be utilized to pivotably couple the second seat assembly 42, including the second seat bottom 50, to the seat support platform 18. As such, all description of the first and second mounting assemblies 100, 140 being arranged on the first seat bottom 38 also applies to the second seat bottom 50 and all associated components.

As shown in FIGS. 8A and 8B, the first mounting assembly 100 includes a first support member 104 coupled to the seat support platform 18 adjacent to the inner side 21 of the seat platform 18 and a protrusion 136 extending away from the first lateral side 39 of the seat bottom 38. The first support member 104 includes a first resilient recess 114 operable to receive the protrusion 136 when the seat bottom 38 is in the raised arrangement so as to retain the seat bottom 38 in the raised arrangement, as shown in FIG. 8B. The first support member 104 is arranged adjacent to the first lateral side 38 of the seat bottom 38.

As shown in FIGS. 8A and 8B, the second mounting assembly 140 includes a second support member 144 spaced apart from the first support member 104 and coupled to the seat support platform 18 adjacent to the inner side 21 of the seat support platform 18. Although not shown, the second support member 144 is arranged adjacent to second lateral side 40 of the seat bottom 38. The second mounting assembly 140 further includes a protrusion 176 extending away from the second lateral side 40 of the seat bottom 38. The second support member 144 includes a second resilient recess 154 operable to receive the protrusion 176 when the seat bottom 38 is in the raised arrangement so as to retain the seat bottom 38 in the raised arrangement, as shown in FIG. 8B.

Illustratively, the first support member 104 includes a main body portion 105 having a lower extension 106 which includes a free end 110, as shown in FIGS. 8A and 8B. A lower side 116 of the main body portion 105 is coupled to the seat support platform 18. The first resilient recess 114 is formed as a U-shaped channel between the free end 110 and the main body portion 105 of the first support member 104.

In the raised arrangement in which the protrusion 136 is arranged in the first resilient recess 114, the free end 110 and/or the main body portion 105 are deformed slightly away from each other by the first protrusion 136. In some embodiments, only one of the free end 110 and the main body portion 105 are deformable. Simultaneously, the free end 110 and the main body portion 105 maintain pressure on the protrusion 136 such that the protrusion 136 is securely arranged in the first resilient recess 114. In some embodiments, the first resilient recess 114 generally matches an outer contour of the protrusion 136.

Illustratively, the second support member 144 includes a main body portion 145 having a lower extension 146 which includes a free end 150, as shown in FIGS. 8A and 8B. A lower side 156 of the main body portion 145 is coupled to the seat support platform 18. The second resilient recess 144 is formed as a U-shaped channel between the free end 150 and the main body portion 145 of the second support member 144.

In the raised arrangement in which the protrusion 176 is arranged in the second resilient recess 154, the free end 150 and/or the main body portion 105 are deformed slightly away from each other by the second protrusion 176. In some embodiments, only one of the free end 150 and the main body portion 145 are deformable. Simultaneously, the free end 150 and the main body portion 145 maintain pressure on the protrusion 176 such that the protrusion 176 is securely arranged in the second resilient recess 154. In some embodiments, the second resilient recess 154 generally matches an outer contour of the protrusion 176.

As described above, the first support member 104 includes a first opening 117 formed therethrough and the second support member 144 includes a second opening 157 formed therethrough, both being formed in upper portions 107, 147 of the main body portions 105, 145. The mounting assembly 100 includes a first coupling protrusion 132 extending away from the first lateral side 39 of the seat bottom 38 and a second coupling protrusion 172 extending away from the second lateral side 40 of the seat bottom 38. The first coupling protrusion 132 is arranged within the first opening 117 and the second coupling protrusion 172 is arranged within the second opening 157. The coupling protrusions 132, 172 are rotatably movable within the first and second openings 117, 157 such that the seat bottom 38 is operable to freely pivot about the pivot axis 41.

The first protrusion 136 is spaced apart from the first coupling protrusion 132 on the first lateral side 39 of the seat bottom 38, and the second protrusion 176 is spaced apart from the second coupling protrusion 172 on the second lateral side 40 of the seat bottom 38, as shown in FIGS. 8A and 8B. The first and second protrusions 136, 176 are arranged on the first and second lateral sides 39, 40 radially outwardly of the pivot axis 41 such that the first and second protrusions 136, 176 travel along first and second circumferential paths about the pivot axis 41 in response to the seat bottom 38 moving between the raised and lowered arrangements.

In some embodiments, the support members 100, 140 may be coupled to the seat support platform 18 via fasteners such as bolts and screws. Other fastening means such as snap on configurations, adhesives, molding the member 100, 140 to the seat support platform 18, and the like may be utilized.

Referring to FIGS. 9A-10C, the detachable platform mounting assemblies 200, 240 are mounted at least on the detachable platform assembly 80 so as to extend from an inner side 81 of the main platform 82 toward the seat frame 14 when in a mounting orientation. Also, receiving components of the detachable platform mounting assemblies 200, 240, such as the hook members 230, 270, may be mounted on the outer side 23 of the seat support platform 18 (also referred to as a first position) for receiving the mounting member assemblies 202, 242 of the assemblies 200, 240. Moreover, as shown in FIGS. 1-7, the receiving components of the detachable platform mounting assemblies 200, 240 may be illustratively mounted on the flat main surface 78 of the detachable platform support plate 76 (also referred to as a second position).

As shown in FIGS. 1-7, the detachable platform assembly 80 is configured to be arranged in various positions on the modular seat assembly 10 and in lowered and raised arrangements. For example, FIG. 1 shows the detachable platform assembly 80 in the first position attached to hook members 230, 270 on the detachable platform support plate 76 and in a lowered arrangement. FIG. 2B shows the detachable platform assembly 80 in the first position attached to hook members 230, 270 on the detachable platform support plate 76 and in a raised arrangement. FIG. 3A shows the detachable platform assembly 80 in the second position attached to hook members 230, 270 on the seat support platform 18 and in the lowered arrangement. FIG. 3B shows the detachable platform assembly 80 in the second position attached to hook members 230, 270 on the seat support platform 18 and in the raised arrangement.

A person skilled in the art will understand that the receiving components of the detachable platform mounting assemblies 200, 240 may be arranged on one or both of the outer side 23 of the seat support platform 18 and the flat main surface 78 of the detachable platform support plate 76.

Illustratively, a first detachable platform mounting assembly 200 includes a first mounting member assembly 202 having a first mounting member 203 arranged on an underside of the main platform 82, as shown in FIGS. 2B and 9A-10C. The first mounting member 203 extends away from the detachable platform 80 toward the seat frame 14 when in a mounting orientation. The first detachable platform mounting assembly 200 further includes a first hook member 230 extending away from one of the seat support platform 18 and the lower support frame 54, in particular the detachable platform support plate 76.

As shown in FIGS. 9A-10C, the first mounting member assembly 202 further includes a first mounting bracket 206 arranged on a terminal end of the first mounting member 203 and coupled thereto via fasteners 204. Illustratively, the first mounting bracket 206 includes a first bracket plate 210 extending away from the terminal end of the first mounting member 203 and a second bracket plate 218 spaced apart and generally parallel to the first bracket plate 210 and extending away from the terminal end of the first mounting member 203. In some embodiments, the first mounting bracket 206 includes a base member 226 from which the mounting bracket plates 210, 218 extend.

The first bracket plate 210 includes first and second holes 212, 214 formed therethrough and spaced apart from each other. Specifically, the bracket plate 210 may be triangular and the holes 212, 214 are spaced apart along a diagonal, downward facing edge of the bracket plate 210, one being closer to the mounting member 203 and one being further from the mounting member 203.

Similarly, the second bracket plate 218 includes first and second holes 220, 222 formed therethrough and spaced apart from each other. The bracket plate 218 may be triangular and the holes 220, 222 are spaced apart along a diagonal, downward facing edge of the bracket plate 218, one being closer to the mounting member 203 and one being further from the mounting member 203. Illustratively, the holes 220, 222 are aligned with the holes 212, 214.

Figures 9A, 9B:
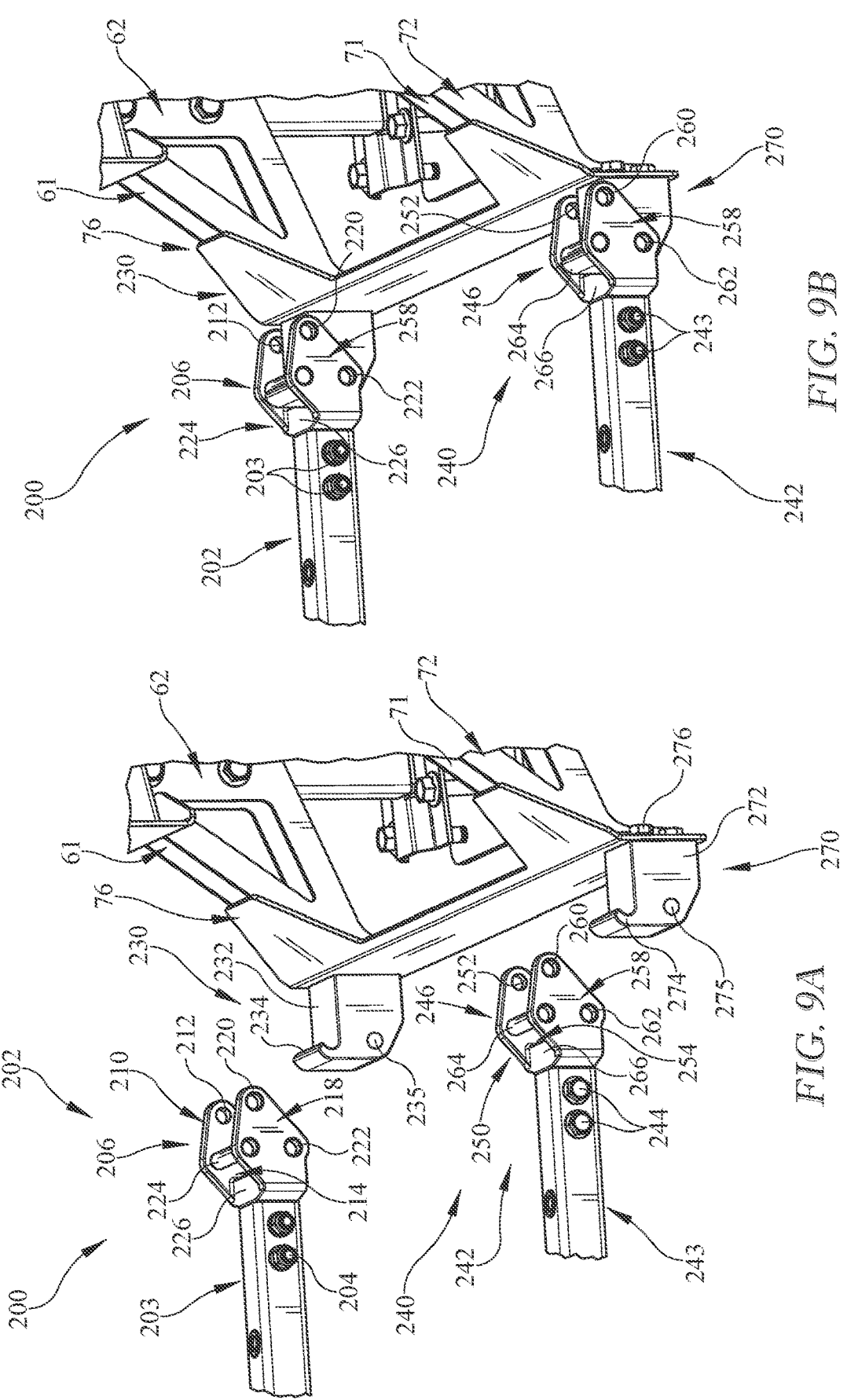
FIG. 9A is a side perspective view of two mounting members of the detachable platform operable to couple the detachable platform to the two hook members arranged on the lower support frame of the modular seat assembly of FIG. 1, showing the detachable platform detached from the lower support frame.
FIG. 9B is a side perspective view of the two mounting members of the detachable platform of FIG. 9A, showing the detachable platform attached to the lower support frame.
Figure 10A:
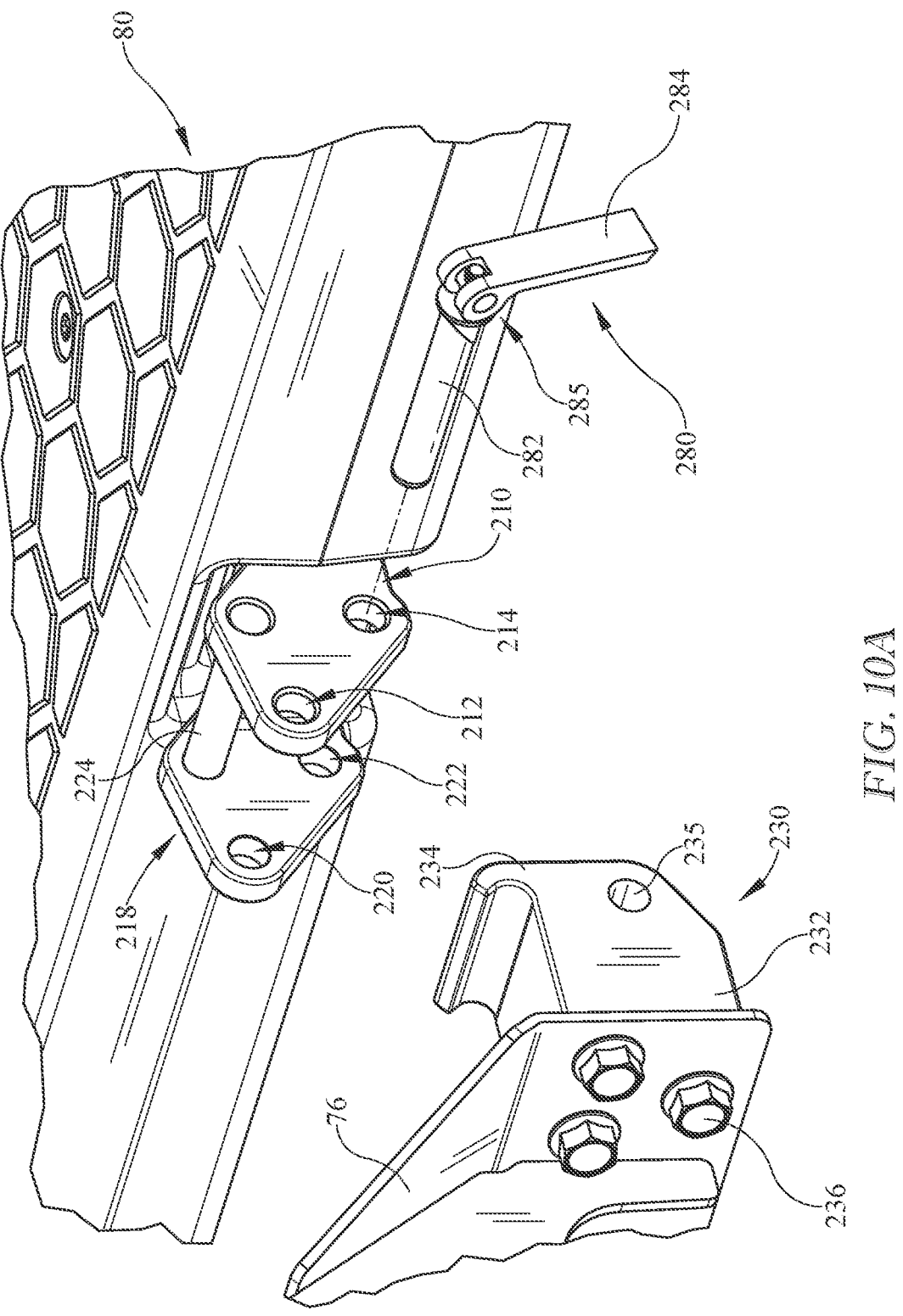
FIG. 10A is a perspective view of a mounting member of the detachable platform and a hook member of FIG. 9A, showing the detachable platform detached from the lower support frame.

The first mounting bracket 206 further includes a first rod 224 extending between the first and second bracket plates 210, 218, as shown in FIGS. 9A and 10A. The first rod 224 is operable to rotatably engage with the first hook member 230 so as to aid in rotatably mounting the first mounting member assembly 202 to the first hook member 230. The first hook member 230 includes a first hook body 232, a first hook 234 arranged on a terminal end of the first hook body 232 facing away from the lower support frame 54 and a hole 235 formed through the first hook body 232. The first hook body 232 may be secured to the seat support platform 18 or the plate 76 via fasteners 236. In some embodiments, the bracket plates 210, 218, the rod 224, and the base member 226 may be formed as a single, integrally formed monolithic component.

Figures 10B, 10C:
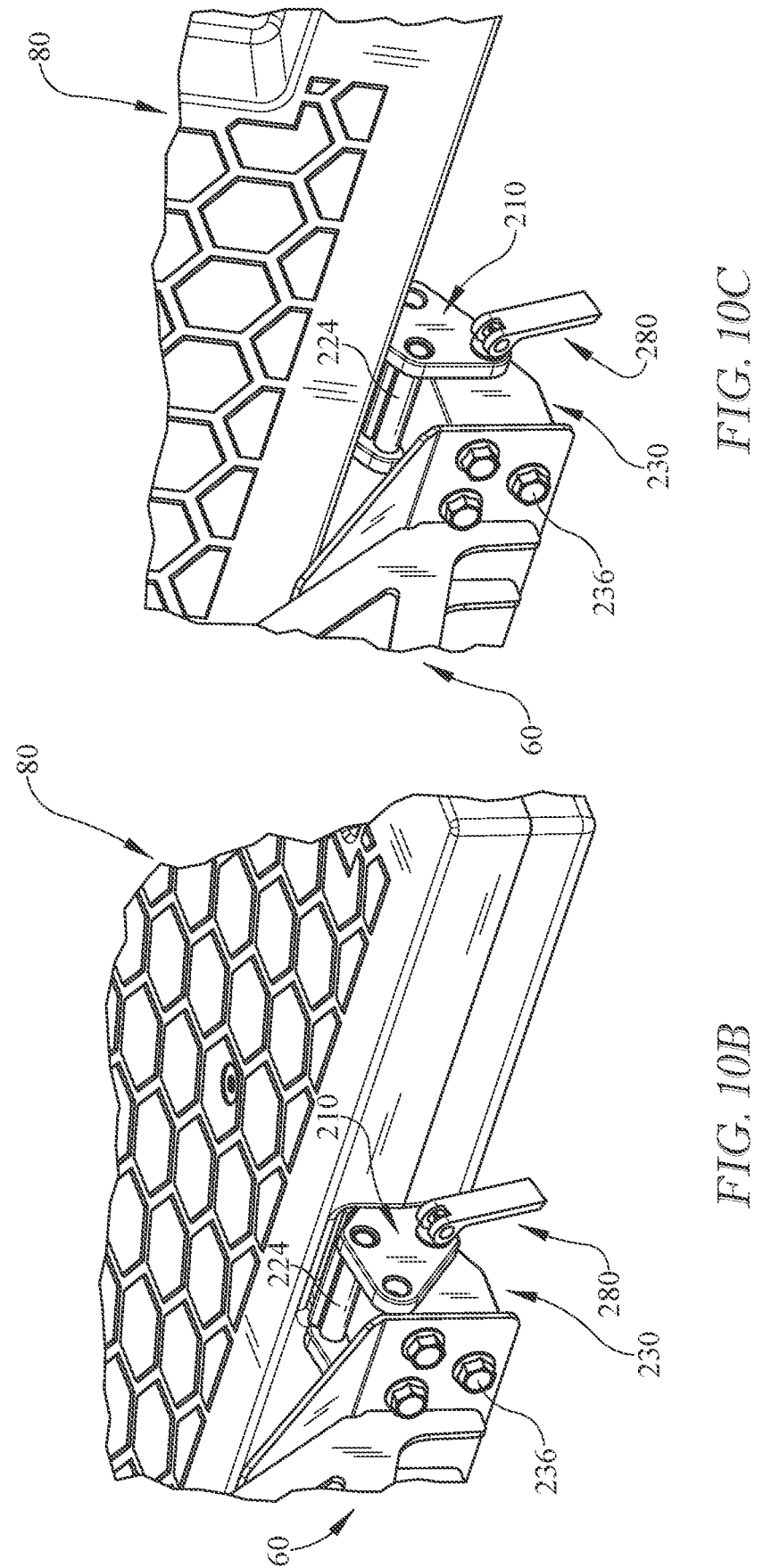
FIG. 10B is a perspective view of the mounting member of the detachable platform and the hook member of FIG. 9A, showing the detachable platform attached to the lower support frame and in the lowered arrangement.
FIG. 10C is a perspective view of the mounting member of the detachable platform and the hook member of FIG. 9A, showing the detachable platform attached to the lower support frame and in the raised arrangement.

In the lowered arrangement, as shown in FIGS. 9A, 9B, and 10B, the holes 214, 222 are aligned with the hole 235 formed in the first hook member 230 such that a first pin 280 may be inserted through the holes 214, 222 and the hole 235 to retain the detachable platform assembly 80 in the lowered arrangement. In the raised arrangement, as shown in FIG. 10C, the holes 212, 220 are aligned with the hole 235 formed in the first hook member 230 such that the first pin 280 may be inserted through the holes 212, 220 and the hole 235 to retain the detachable platform assembly 80 in the raised arrangement. Illustratively, the first pin 280 may include a cylindrical pin body 282 and a latch 284 coupled the pin body 282 at a rotatable connection point 285 and operable to lock the pin body 282 within the holes.

Illustratively, a second detachable platform mounting assembly 240 includes a second mounting member assembly 242 having a second mounting member 243 arranged on an underside of the main platform 82, as shown in FIGS. 2B and 9A-10C. The second mounting member 243 may be parallel to the first mounting member 243. The second mounting member 243 extends away from the detachable platform 80 toward the seat frame 14 when in a mounting orientation. The second detachable platform mounting assembly 240 further includes a second hook member 270 extending away from one of the seat support platform 18 and the lower support frame 54, in particular the detachable platform support plate 76.

As shown in FIGS. 9A-10C, the second mounting member assembly 242 further includes a second mounting bracket 246 arranged on a terminal end of the second mounting member 243 and coupled thereto via fasteners 244. Illustratively, the second mounting bracket 246 includes a first bracket plate 250 extending away from the terminal end of the first mounting member 243 and a second bracket plate 258 spaced apart and generally parallel to the first bracket plate 250 and extending away from the terminal end of the second mounting member 243. In some embodiments, the second mounting bracket 246 includes a base member 266 from which the mounting bracket plates 250, 258 extend.

The first bracket plate 250 includes first and second holes 252, 254 formed therethrough and spaced apart from each other. Specifically, the bracket plate 250 may be triangular and the holes 252, 254 are spaced apart along a diagonal, downward facing edge of the bracket plate 250, one being closer to the mounting member 243 and one being further from the mounting member 243.

Similarly, the second bracket plate 258 includes first and second holes 260, 262 formed therethrough and spaced apart from each other. The bracket plate 258 may be triangular and the holes 260, 262 are spaced apart along a diagonal, downward facing edge of the bracket plate 258, one being closer to the mounting member 243 and one being further from the mounting member 243. Illustratively, the holes 260, 262 are aligned with the holes 252, 254.

The second mounting bracket 246 further includes a first rod 264 extending between the first and second bracket plates 250, 258, as shown in FIGS. 9A and 10A. The first rod 264 is operable to rotatably engage with the second hook member 270 so as to aid in rotatably mounting the second mounting member assembly 242 to the second hook member 270. The second hook member 270 includes a second hook body 272, a second hook 274 arranged on a terminal end of the second hook body 272 facing away from the lower support frame 54 and a hole 275 formed through the second hook body 272. The second hook body 272 may be secured to the seat support platform 18 or the plate 76 via fasteners 276.

In the lowered arrangement, as shown in FIGS. 9A, 9B, and 10B, the holes 254, 262 are aligned with the hole 275 formed in the second hook member 270 such that a first pin 280 may be inserted through the holes 254, 262 and the hole 275 to retain the detachable platform assembly 80 in the lowered arrangement. In the raised arrangement, as shown in FIG. 10C, the holes 252, 260 are aligned with the hole 275 formed in the second hook member 270 such that the first pin 280 may be inserted through the holes 252, 260 and the hole 275 to retain the detachable platform assembly 80 in the raised arrangement.

Figures 11A, 11B:
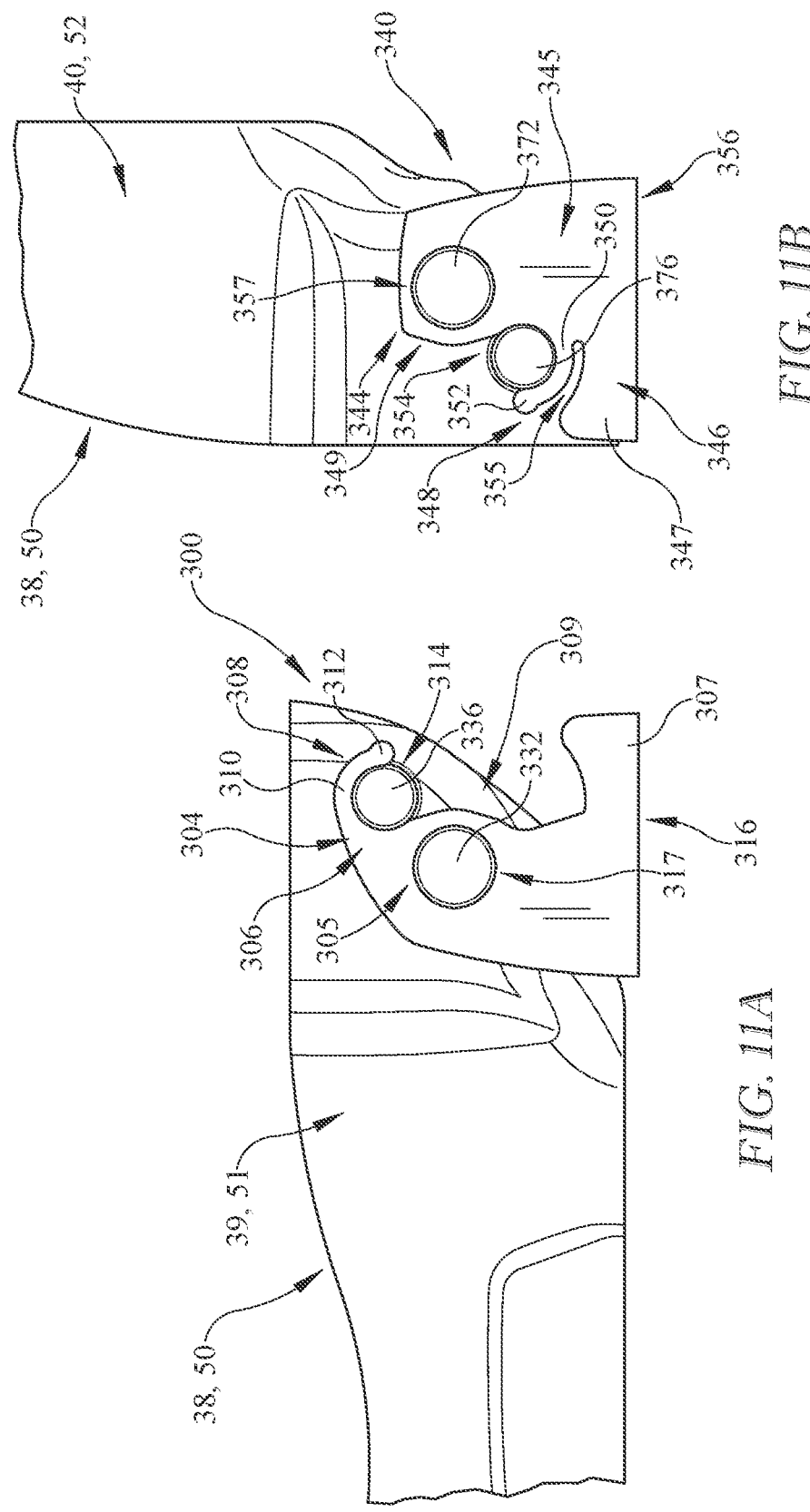
FIG. 11A is a side view of a support member operable to hold the seat bottom of the seat of the modular seat assembly of FIG. 1 in the raised and lowered arrangements, showing the seat bottom being held in the lowered arrangement.
FIG. 11B is a side view of a support member of the modular seat assembly of FIG. 11A, showing the seat bottom being held in the raised arrangement.

Another embodiment of a mounting assembly 300 in accordance with the present disclosure is shown in FIGS. 11A and 11B. A person skilled in the art will understand that the mounting assembly 300 may be utilized with one or both of the seat assemblies 30, 42 similarly to how the mounting assemblies 100, 140 are utilized therewith, or any other seat assemblies arranged on the modular seat assembly 10. Any combination of the mounting assemblies 100, 140, 300 and the mounting assemblies described in further detail below may be utilized in the seat assemblies 30, 42. As such, the descriptions of the mounting assemblies 100, 140 are incorporated by reference to apply to the mounting assembly 300, except in instances when these descriptions conflict with the specific description and the drawings of the mounting assembly 300. Also, similar to the previous embodiments, the mounting assembly 300 may be utilized on one, multiple, or all of the lateral sides 39, 40, 51, 52 of the seat bottoms 38, 50, and as such, any reference to one of the seat bottoms 38, 50 in the description below may refer to the other seat bottom 38, 50 as well The first mounting assembly 300 is illustratively arranged on the first lateral side 39 of the seat bottom 38 and the second mounting assembly 340 is illustratively arranged on the second lateral side 40 of the seat bottom 38, as shown in FIGS. 11A and 11B. In operation, in the raised arrangement, the seat bottom 38 is raised toward the seat back 34, and, in the lowered arrangement, the seat bottom 38 is substantially parallel with the seat support platform 18.

A person skilled in the art will understand that the mounting assemblies 300, 340 may be arranged in the opposite arrangement, with the first mounting assembly 300 on the second lateral side 40 and the second mounting assembly 340 on the first lateral side 39. Moreover, the first and second mounting assemblies 300, 340 may be utilized to pivotably couple the second seat assembly 42, including the second seat bottom 50, to the seat support platform 18. As such, all description of the first and second mounting assemblies 300, 340 being arranged on the first seat bottom 38 also applies to the second seat bottom 50 and all associated components.

As shown in FIG. 11A, the first mounting assembly 300 includes a first support member 304 coupled to the seat support platform 18 adjacent to the inner side 21 of the seat platform 18 and a protrusion 336 extending away from the first lateral side 39 of the seat bottom 38. The first support member 304 includes a first resilient flexible catch 308 operable to receive the protrusion 336 when the seat bottom 38 is in the lowered arrangement so as to retain the seat bottom 38 in the lowered arrangement. The first support member 304 is arranged adjacent to the first lateral side 38 of the seat bottom 38.

As shown in FIG. 11B, the second mounting assembly 340 includes a second support member 344 spaced apart from the first support member 304 and coupled to the seat support platform 18 adjacent to the inner side 21 of the seat support platform 18. The second support member 344 is arranged adjacent to second lateral side 40 of the seat bottom 38. The second mounting assembly 340 further includes a protrusion 376 extending away from the second lateral side 40 of the seat bottom 38. The second support member 344 includes a second resilient flexible catch 348 operable to receive the protrusion 376 when the seat bottom 38 is in the raised arrangement so as to retain the seat bottom 38 in the raised arrangement.

Illustratively, the first support member 304 includes a main body portion 305 having a top side 306, as shown in FIG. 11A. A lower side 316 of the main body portion 305 is coupled to the seat support platform 18. The first resilient flexible catch 308 is arranged on the top side 306 of the first support member 304. The first resilient flexible catch 308 includes a base end 310 and a free end 312, the base end 310 being rigidly coupled to the main body portion 305 of the first support member 304 adjacent to the top side 304. As such, the first resilient flexible catch 308 extends away from the main body portion 305 and forms a U-shaped channel 314 between the main body portion 305 and the free end 312.

In the lowered arrangement in which the protrusion 336 is arranged in the U-shaped channel 314 formed by the first resilient flexible catch 308, the free end 312 of the first resilient flexible catch 308 is flexed slightly away from main body portion 305 by the first protrusion 336. Simultaneously, the first resilient flexible catch 308 maintains pressure on the protrusion 336 such that the protrusion 336 is securely arranged in the U-shaped channel 314. In some embodiments, the U-shaped channel 314 generally matches an outer contour of the protrusion 336.

Illustratively, the second support member 344 includes a main body portion 345 having a bottom side 346, as shown in FIG. 11B. A lower side 356 of the main body portion 345 is coupled to the seat support platform 18. The second resilient flexible catch 348 of the second support member 344 is arranged on the bottom side 346 of the second support member 344. The second resilient flexible catch 348 includes a base end 350 and a free end 352, the base end 350 being rigidly coupled to the main body portion 345 of the second support member 344 adjacent to the bottom side 346. As such, the second resilient flexible catch 348 extends away from the main body portion 345 and forms a U-shaped channel 354 between the main body portion 345 and the free end 352.

In the raised arrangement in which the protrusion 376 is arranged in the U-shaped channel 354 formed by the second resilient flexible catch 348, the free end 352 of the second resilient flexible catch 348 is flexed slightly away from main body portion 345 by the protrusion 376. Simultaneously, the second resilient flexible catch 348 maintains pressure on the protrusion 376 such that the protrusion 376 is securely arranged in the U-shaped channel 354. Illustratively, a space 355 is provided between the catch 348 and a lower extension 347 of the bottom side 346 so as to allow for the outward flexing of the catch 348. In some embodiments, the U-shaped channel 354 generally matches an outer contour of the protrusion 376.

As described above, the first support member 304 includes a first opening 317 formed therethrough and the second support member 344 includes a second opening 157 formed therethrough. The mounting assembly 300 includes a first coupling protrusion 332 extending away from the first lateral side 39 of the seat bottom 38 and a second coupling protrusion 372 extending away from the second lateral side 40 of the seat bottom 38. The first coupling protrusion 332 is arranged within the first opening 317 and the second coupling protrusion 372 is arranged within the second opening 157. The coupling protrusions 332, 372 are rotatably movable within the first and second openings 317, 157 such that the seat bottom 38 is operable to freely pivot about the pivot axis 41.

The first protrusion 336 is spaced apart from the first coupling protrusion 332 on the first lateral side 39 of the seat bottom 38, and the second protrusion 376 is spaced apart from the second coupling protrusion 372 on the second lateral side 40 of the seat bottom 38, as shown in FIGS. 11A and 11B. The first and second protrusions 336, 376 are arranged on the first and second lateral sides 39, 40 radially outwardly of the pivot axis 41 such that the first and second protrusions 336, 376 travel along first and second circumferential paths about the pivot axis 41 in response to the seat bottom 38 moving between the raised and lowered arrangements. In particular, a movement region 309 of the protrusion 336 is defined between a lower extension 307 of the main body portion 305 of the first support member 304 and the U-shaped channel 314 along the outside of the main body portion 305. Similarly, a movement region 349 of the protrusion 376 is defined upwardly from the U-shaped channel 354 along the outside of the main body portion 145 of the second support member 344.

A person skilled in the art will understand that the support members 300, 340 may be alternatively configured to include resilient flexible catches 308, 348 arranged in positions opposite as those described above, as well as rotated 180 degrees, such that the support members 300, 340 retain the seat bottom 38 in the raised and lowered arrangements in the opposite manner. For example, the protrusion 336 can be arranged on the seat bottom 38 such that the support member 300 shown in FIG. 11A holds the seat bottom 38 in the raised arrangement (i.e. if the seat bottom 38 were shown to be in the raised arrangement in FIG. 11A). Similarly, the protrusion 376 can be arranged on the seat bottom 38 such that the support member 340 shown in FIG. 11B holds the seat bottom 38 in the lowered arrangement (i.e. if the seat bottom 38 were shown to be in the lowered arrangement in FIG. 11B, the seat bottom 38 would extend to the left when in the lowered arrangement).

In some embodiments, the support members 300, 340 may be coupled to the seat support platform 18 via fasteners such as bolts and screws. Other fastening means such as snap on configurations, adhesives, molding the member 300, 340 to the seat support platform 18, and the like may be utilized.

Figures 12A, 12B, 12C:
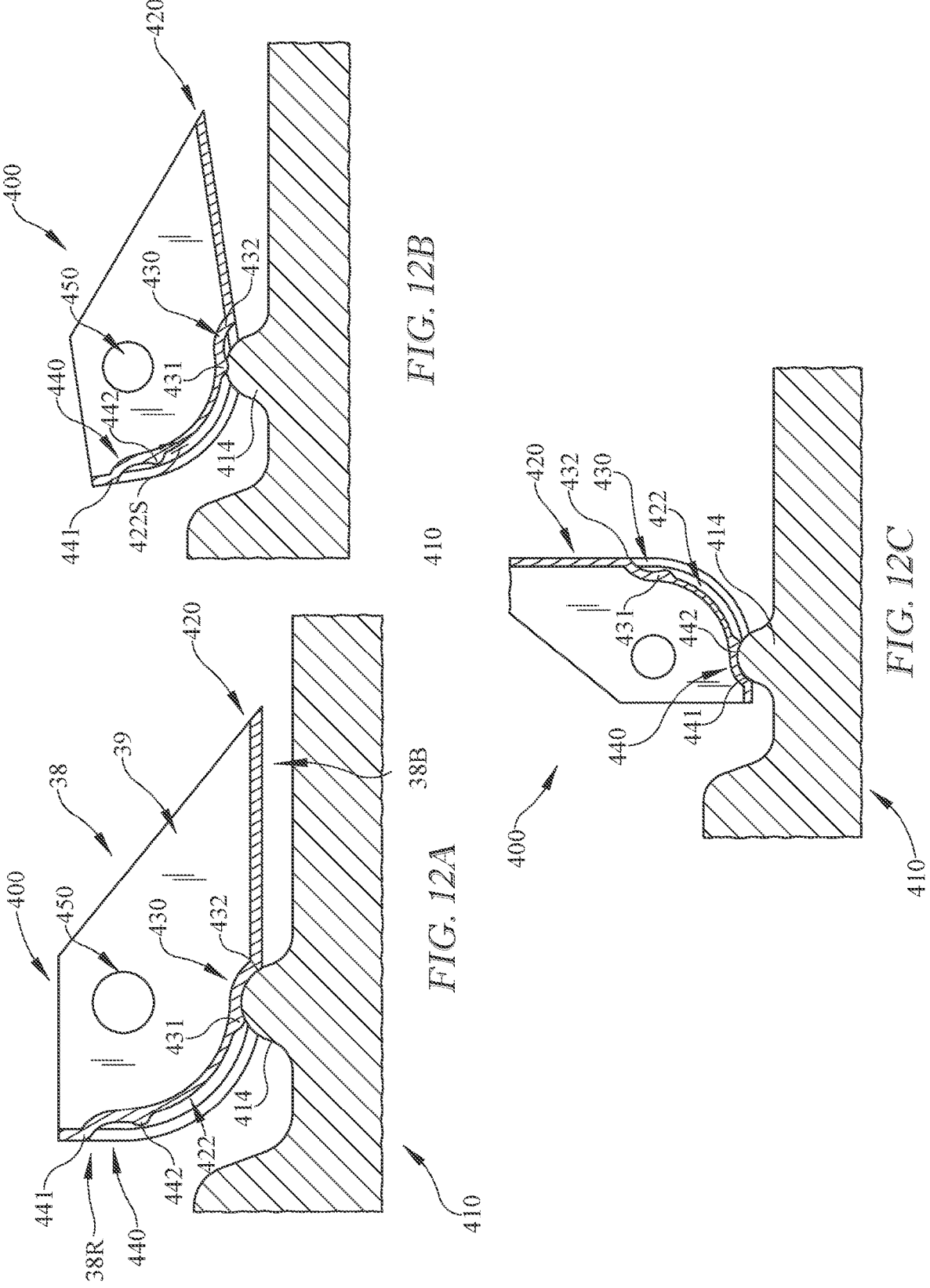
FIG. 12A is a side view of a support member operable to hold the seat bottom of the seat of the modular seat assembly of FIG. 1 in the raised and lowered arrangements according to a further aspect of the present disclosure, showing the seat bottom being held in the lowered arrangement.
FIG. 12B is a side view of a support member of the modular seat assembly of FIG. 12A, showing the seat bottom being moved from the lowered arrangement to the raised arrangement.
FIG. 12C is a side view of a support member of the modular seat assembly of FIG. 12A, showing the seat bottom being held in the raised arrangement.

Another embodiment of a mounting assembly 400 in accordance with the present disclosure is shown in FIGS. 12A-12C. A person skilled in the art will understand that the mounting assembly 400 may be utilized with one or both of the seat assemblies 30, 42 similarly to how the mounting assemblies 100, 140 are utilized therewith, or any other seat assemblies arranged on the modular seat assembly 10. Any combination of the mounting assemblies 100, 140, 300, 400 and the mounting assemblies described in further detail below may be utilized in the seat assemblies 30, 42. As such, the descriptions of the mounting assemblies 100, 140, 300 are incorporated by reference to apply to the mounting assembly 400, except in instances when these descriptions conflict with the specific description and the drawings of the mounting assembly 400. Also, similar to the previous embodiments, the mounting assembly 400 may be utilized on one, multiple, or all of the lateral sides 39, 40, 51, 52 of the seat bottoms 38, 50, and as such, any reference to one of the seat bottoms 38, 50 in the description below may refer to the other seat bottom 38, 50 as well.

Illustratively, the mounting assembly 400 includes a first support member 410 that is coupled to the seat support platform 18 adjacent to the inner side 21 of the seat platform 18 and includes a protrusion 414, as shown in FIGS. 12A-12C. The mounting assembly 400 further includes an engagement surface 420 formed on the first lateral side 39 of the seat bottom 38 operable to engage with the first support member 410 and retain the seat bottom 38. In some embodiments, the engagement surface 420 may be formed in a recessed portion 422 of the lateral side 39 such that the protrusion 414 may extend into the recessed portion 422 and engage the engagement surface 420.

The engagement surface includes a first detent 430 formed on the first lateral side 39 and a second detent 440 formed on the first lateral side 39 spaced apart from the first detent 430, as shown in FIGS. 12A-12C. The seat bottom 38 is pivotable about the first support member 410 between a raised arrangement and a lowered arrangement. The first protrusion 414 extends upwardly toward the first lateral side 39 of the seat bottom 38.

Illustratively, the second detent 440 is configured to receive the first protrusion 414 when the seat bottom 38 is in the raised arrangement so as to retain the seat bottom 38 in the raised arrangement, as shown in FIG. 12C. Similarly, the first detent 430 is configured to receive the first protrusion 414 when the seat bottom 38 is in the lowered arrangement so as to retain the seat bottom 38 in the lowered arrangement.

In some embodiments, the first lateral side 39 includes the curved recessed edge portion 422 formed at a rear side 38R of the seat bottom 38 adjacent to the inner side 21 of the seat platform 18, as shown in FIGS. 12A-12C. The curved recessed edge portion 422 is formed between and interconnects a bottom side 38B of the seat bottom 38 and the rear side 38R of the seat bottom 38. The curved recessed edge portion 422 includes a bottom recess surface 422A having a first ridge 431 formed thereon and a second ridge 442 formed thereon and spaced apart from the first ridge 431. Illustratively, the first detent 430 is defined between the first ridge 431 and an end 432 of the bottom side 38B of the seat bottom 38. Similarly, the second detent 440 is defined between the second ridge 442 and an end 441 of the rear side 38R of the seat bottom 38. The ends 432, 441 may be considered transitions that transition into the flat rear 38R and flat bottom 38B surfaces of the seat bottom 38. An angle formed between the ends 432, 441 from the curved recessed edge portion 422 to the rear 38R and bottom 38B surfaces of the seat bottom 38 may be approximately 90 degrees in some embodiments.

In some embodiments, the first and second ridges 431, 442 are flexibly resilient so as to allow entry of the first protrusion 414 into the first and second detents 430, 440 when moving the seat bottom 38 into the raised and lowered arrangements, and so as to maintain pressure on the first protrusion 414 such that the first protrusion 414 is securely arranged in the detents 430, 440 in the raised and lowered arrangements.

The first lateral side 39 of the seat bottom 38 may include a first opening 450 formed therethrough that defines a pivot axis of the seat bottom 38, as shown in FIGS. 12A and 12B. In the raised arrangement, the seat bottom 38 is raised such that the second detent 440 is located between the first opening 450 and the first protrusion 414, and in the lowered arrangement, the seat bottom 38 is lowered such that the first detent 430 is located between the first opening 450 and the first protrusion 414.

Figures 13A, 13B, 13C:
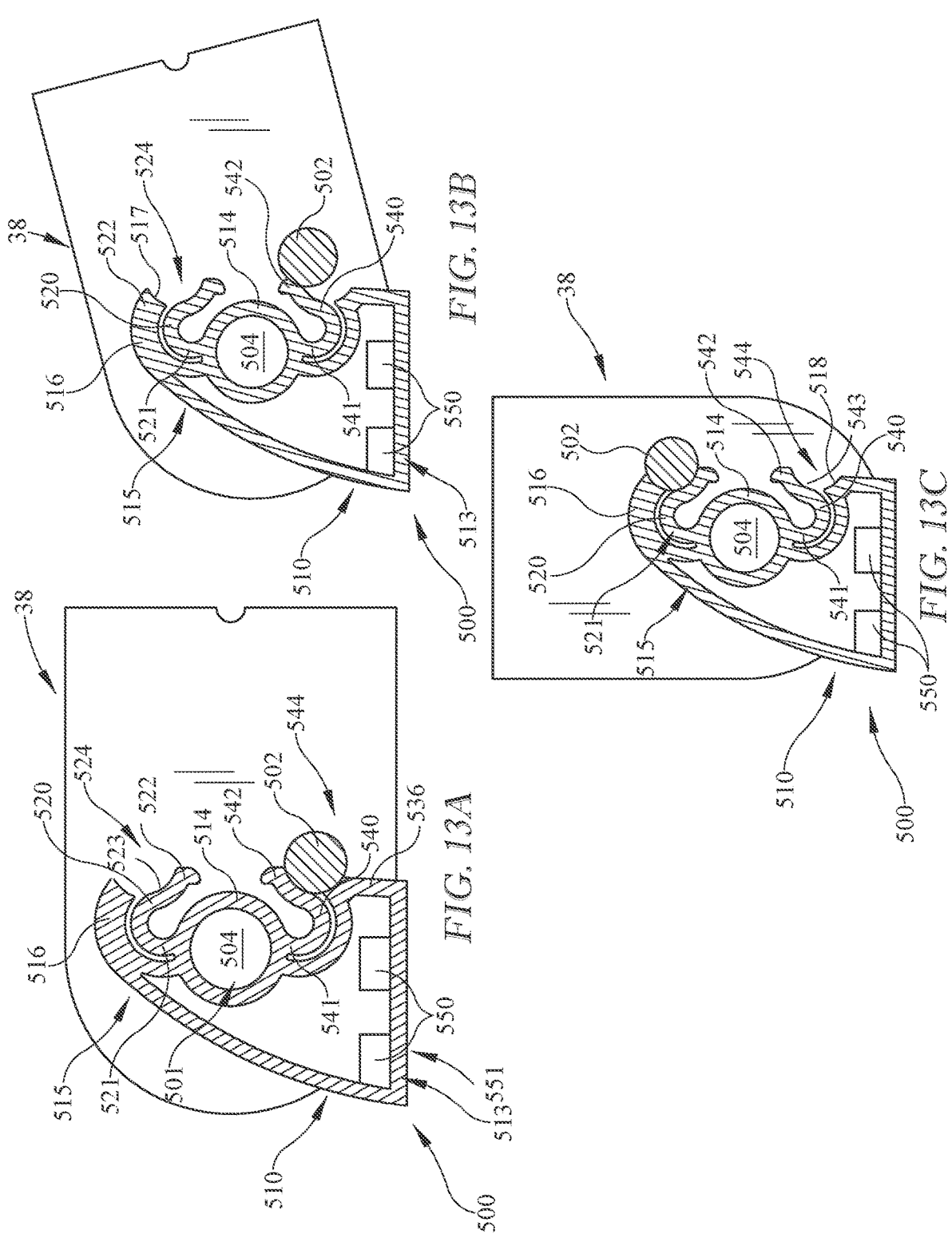
FIG. 13A is a side view of a support member operable to hold the seat bottom of the seat of the modular seat assembly of FIG. 1 in the raised and lowered arrangements according to a further aspect of the present disclosure, showing the seat bottom being held in the lowered arrangement by a resilient member.
FIG. 13B is a side view of a support member of the modular seat assembly of FIG. 13A, showing the seat bottom being moved from the lowered arrangement to the raised arrangement.
FIG. 13C is a side view of a support member of the modular seat assembly of FIG. 13A, showing the seat bottom being held in the raised arrangement by a second resilient member.

Another embodiment of a mounting assembly 500 in accordance with the present disclosure is shown in FIGS. 13A-13C. A person skilled in the art will understand that the mounting assembly 500 may be utilized with one or both of the seat assemblies 30, 42 similarly to how the mounting assemblies 100, 140, 300, 400 are utilized therewith, or any other seat assemblies arranged on the modular seat assembly 10. Any combination of the mounting assemblies 100, 140, 300, 400, 500 and the mounting assemblies described in further detail below may be utilized in the seat assemblies 30, 42. As such, the descriptions of the mounting assemblies 100, 140, 300, 400 are incorporated by reference to apply to the mounting assembly 500, except in instances when these descriptions conflict with the specific description and the drawings of the mounting assembly 500. Also, similar to the previous embodiments, the mounting assembly 500 may be utilized on one, multiple, or all of the lateral sides 39, 40, 51, 52 of the seat bottoms 38, 50, and as such, any reference to one of the seat bottoms 38, 50 in the description below may refer to the other seat bottom 38, 50 as well.

The mounting assembly 500 including a first support member 510 coupled to the seat support platform 18 adjacent and a first protrusion 502 extending away from a first lateral side 39 of the seat bottom 38, as shown in FIGS. 13A-13C. The seat bottom 38 is coupled to and is pivotable about the first support member 510 between a raised arrangement and a lowered arrangement via a first coupling protrusion 501 that extends away from the lateral side 39 and through a corresponding opening 504 formed in the first support member 510. The first support member 510 is arranged on the first lateral side 39 of the seat bottom 38.

Illustratively, the first support member 510 includes a first resilient flexible catch 520 configured to receive the first protrusion 502 when the seat bottom 38 is in the raised arrangement so as to retain the seat bottom 38 in the raised arrangement and a second resilient flexible catch 540 configured to receive the first protrusion 502 when the seat bottom 38 is in the lowered arrangement so as to retain the seat bottom 38 in the lowered arrangement. The first support member 510 is arranged on the first lateral side 39 of the seat bottom 38.

In some embodiments, the first support member 510 includes a bottom portion 513, a top portion 515 opposite the bottom portion 513, and a central portion 514 between the top and bottom portions 515, 513, as shown in FIGS. 13A-13C. The first support member 510 may also include fasteners 550 formed on a flat base platform 551 of the support member 510 to couple the support member 510 to the seat support platform 18. Other fastening means such as snap on configurations, adhesives, molding the member 510 to the seat support platform 18, and the like may be utilized. The central portion 514 may at least partially encircle the opening 504 and define the opening 504. The top portion 515 includes a first projection 516 extending away from the top portion 515 and the first resilient flexible catch 520 extends away from the central portion 514 so as to define a first protrusion-receiving space 524 between the first projection 516 and the first resilient flexible catch 520. In the raised arrangement, the first protrusion 502 is secured between the first resilient flexible catch 520 and the first projection 516 so as to retain the seat bottom 38 in the raised arrangement.

In some embodiments, the first resilient flexible catch 520 includes a base end 521 and a free end 522, the base end 521 being rigidly coupled to a top side of the central portion 514, as shown in FIGS. 13A-13C. The catch 520 extends upwardly away from the top of the central portion 514 as shown in FIGS. 13A-13C and curves outwardly and away from the first projection 516 such that the free end 522 is located further outward than the first projection 516. The catch 520 includes an upper protrusion-receiving surface 523 configured to receive at least a portion of the first protrusion 502 when the seat bottom 38 is in the raised arrangement. The first protrusion-receiving space 524 is defined between the upper protrusion-receiving surface 523 and an outer end surface of the first projection 516.

In the raised arrangement, the first protrusion 502 is arranged in the first protrusion-receiving space 524 and the free end 522 of the first resilient flexible catch 520 is flexed slightly away from first projection 502 by the first protrusion 502 while maintaining pressure on the first protrusion 502 such that the first protrusion 502 is securely arranged in the first protrusion-receiving space 524.

Illustratively, the bottom portion 513 includes the second projection 536 extending away from the bottom portion 513, as shown in FIGS. 13A-13C. The second resilient flexible catch 540 extends away from the central portion 514 so as to define a second protrusion-receiving space 544 between the second projection 536 and the second resilient flexible catch 540. In the lowered arrangement, the first protrusion 502 is secured between the second resilient flexible catch 540 and the second projection 536 so as to retain the seat bottom 38 in the lowered arrangement.

In some embodiments, the second resilient flexible catch 540 includes a base end 541 and a free end 542, the base end 541 being rigidly coupled to a bottom side of the central portion 514, as shown in FIGS. 13A-13C. The catch 540 extends downwardly away from the bottom of the central portion 514 as shown in FIGS. 13A-13C and curves outwardly and away from the second projection 536 such that the free end 542 is located further outward than the second projection 536. The catch 540 includes a lower protrusion-receiving surface 543 configured to receive at least a portion of the first protrusion 502 when the seat bottom 38 is in the lowered arrangement. The second protrusion-receiving space 544 is defined between the lower protrusion-receiving surface 543 and an outer end surface of the second projection 536.

In the lowered arrangement, the first protrusion 502 is arranged in the second protrusion-receiving space 544 and the free end 542 of the first resilient flexible catch 540 is flexed slightly away from first projection 502 by the first protrusion 502 while maintaining pressure on the first protrusion 502 such that the first protrusion 502 is securely arranged in the second protrusion-receiving space 544.

In some embodiments, the first protrusion 502 is spaced apart from the first coupling protrusion 501 on the first lateral side 39 of the seat bottom 38, as shown in FIGS. 13A-13C. The first protrusion 502 is arranged on the first lateral side 39 radially outwardly of the pivot axis 41 such that the first protrusion 502 travels along a first circumferential path about the pivot axis 41 in response to the seat bottom 38 moving between the raised and lowered arrangements. In some embodiments, the end surface of the first projection 516 and the upper protrusion-receiving surface 523 that define the first protrusion-receiving space 524 generally each match an outer contour of the first protrusion 502. Similarly, the end surface of the second projection 536 and the lower protrusion-receiving surface 543 that define the second protrusion-receiving space 544 generally each match the outer contour of the first protrusion 502.

Figures 14A, 14B, 14C:
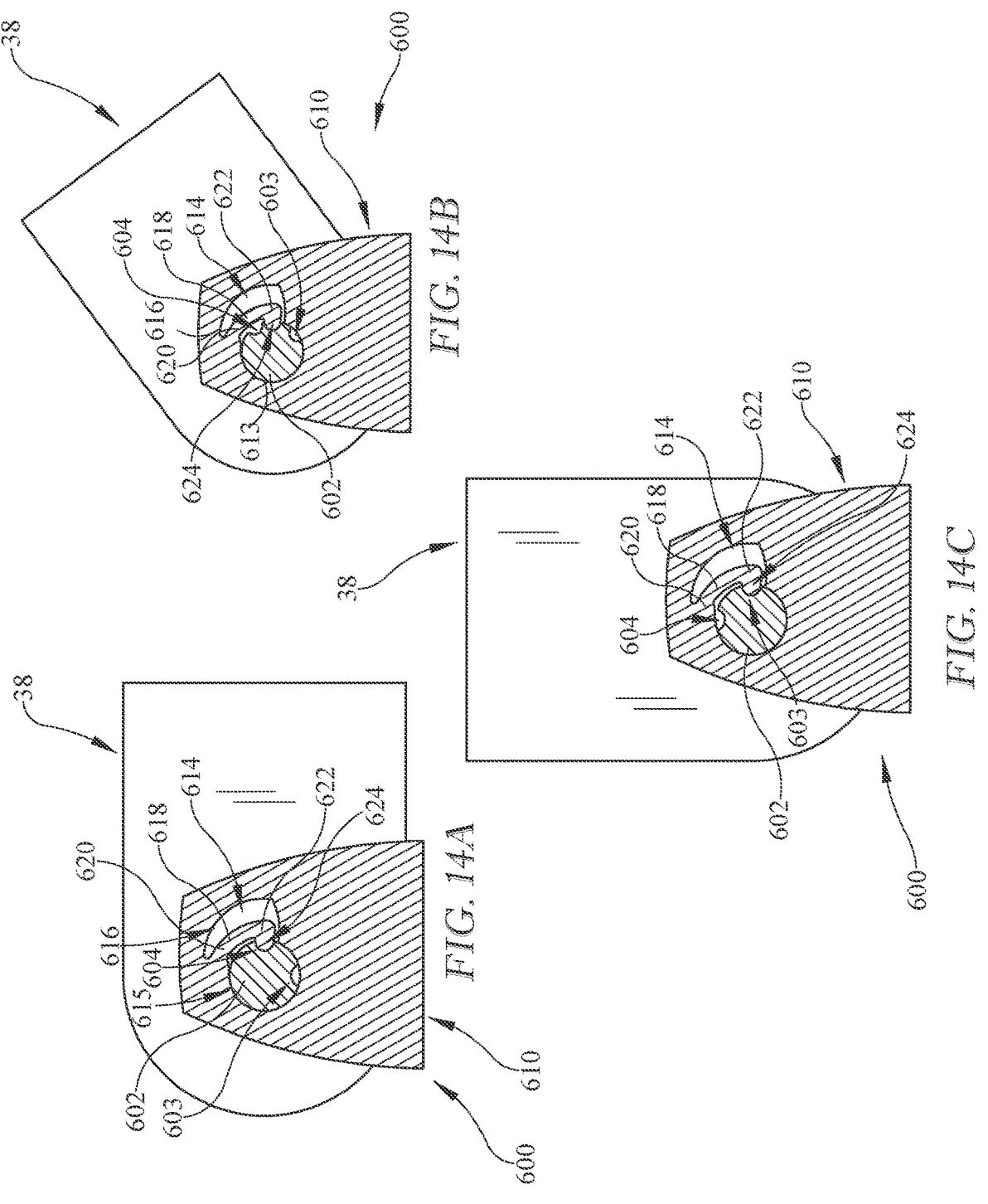
FIG. 14A is a side view of a support member operable to hold the seat bottom of the seat of the modular seat assembly of FIG. 1 in the raised and lowered arrangements according to a further aspect of the present disclosure, showing the seat bottom being held in the lowered arrangement by a resilient member.
FIG. 14B is a side view of a support member of the modular seat assembly of FIG. 14A, showing the seat bottom being moved from the lowered arrangement to the raised arrangement.
FIG. 14C is a side view of a support member of the modular seat assembly of FIG. 14A, showing the seat bottom being held in the raised arrangement by a second resilient member.

Another embodiment of a mounting assembly 600 in accordance with the present disclosure is shown in FIGS. 14A-14C. A person skilled in the art will understand that the mounting assembly 600 may be utilized with one or both of the seat assemblies 30, 42 similarly to how the mounting assemblies 100, 140, 300, 400, 500 are utilized therewith, or any other seat assemblies arranged on the modular seat assembly 10. Any combination of the mounting assemblies 100, 140, 300, 400, 500, 600 and the mounting assemblies described in further detail below may be utilized in the seat assemblies 30, 42. As such, the descriptions of the mounting assemblies 100, 140, 300, 400, 500 are incorporated by reference to apply to the mounting assembly 600, except in instances when these descriptions conflict with the specific description and the drawings of the mounting assembly 600. Also, similar to the previous embodiments, the mounting assembly 600 may be utilized on one, multiple, or all of the lateral sides 39, 40, 51, 52 of the seat bottoms 38, 50, and as such, any reference to one of the seat bottoms 38, 50 in the description below may refer to the other seat bottom 38, 50 as well.

The mounting assembly 600 may include a first support member 610 coupled to the seat support platform 18 adjacent to the inner side 21 of the seat platform 18 and a first protrusion 602 extending away from the first lateral side 39 of the seat bottom 38, as shown in FIGS. 14A-14C. The seat bottom 38 is coupled to and is pivotable about the first support member 610 between a raised arrangement and a lowered arrangement. The first support member 610 includes a first opening 614 within which the first protrusion 602 is rotatably arranged such that the seat bottom 38 is configured to pivot about the pivot axis 41.

The first support member 610 further includes a first resilient flexible member 618 extending into the first opening 614 adjacent to the first protrusion 602, as shown in FIGS. 14A-14C. The opening 614 may include a section 615, or a first protrusion opening 615, formed to securely surround the first protrusion 602 such that the protrusion 602 may rotate therein, and a further, separate section 616, or a first resilient flexible member opening 616, that is larger than the first section 615 and accommodates the first resilient flexible member 618. The first protrusion opening 615 includes a generally annular first perimeter edge 613 and the first resilient flexible member opening 616 includes a second perimeter edge 617 defining the first resilient flexible member opening 616. The first perimeter edge includes first and second ends located at first and second ends of the second perimeter edge 613, 617, respectively.

Illustratively, the first protrusion 602 includes a first detent 603 formed in an outer surface of the first protrusion 602 and opening toward the first resilient flexible member 618 and a second detent 604 formed in the outer surface, spaced apart from the first detent 603, and opening toward the first resilient flexible member 618, as shown in FIGS. 14A-14C. The first detent 603 is configured to receive a portion of the first resilient flexible member 618 when the seat bottom 38 is in the raised arrangement so as to retain the seat bottom 38 in the raised arrangement, and the second detent 604 is configured to receive the portion of the first resilient flexible member 618 when the seat bottom 38 is in the lowered arrangement so as to retain the seat bottom 38 in the lowered arrangement. Illustratively, the outer surface of the first protrusion 602 is generally annular.

In some embodiments, the first resilient flexible member 618 includes a base end 620 and a free end 622, as shown in FIGS. 14A-14C. The base end 620 is rigidly coupled to the second perimeter edge 617 of the first resilient flexible member opening 616. The free end 622 includes a ridge 624 extending away from the first resilient flexible member 618 toward the first protrusion 602. The ridge 624 is sized to fit within the first and second detents 603, 604 formed in the first protrusion 602.

In the raised arrangement, the ridge 624 is arranged in the first detent 603 and the first resilient flexible member 618 and the ridge 624 maintain pressure on the first detent 603 such that the seat bottom 38 is retained in the raised arrangement. Similarly, in the lowered arrangement, the ridge 624 is arranged in the second detent 604 and the first resilient flexible member 618 and the ridge 624 maintain pressure on the second detent 604 such that the seat bottom 38 is retained in the lowered arrangement. The opening 614 includes an open space between an edge of the first resilient flexible member 618 and the second perimeter edge 617 so as to allow the first resilient flexible member 618 to flex away from the first protrusion 602 when the seat bottom 38 is moved between the raised and lowered arrangements.

In some embodiments, the support member 610 may be coupled to the seat support platform 18 via fasteners such as bolts and screws. Other fastening means such as snap on configurations, adhesives, molding the member 610 to the seat support platform 18, and the like may be utilized.

Figures 15A, 15B, 15C:
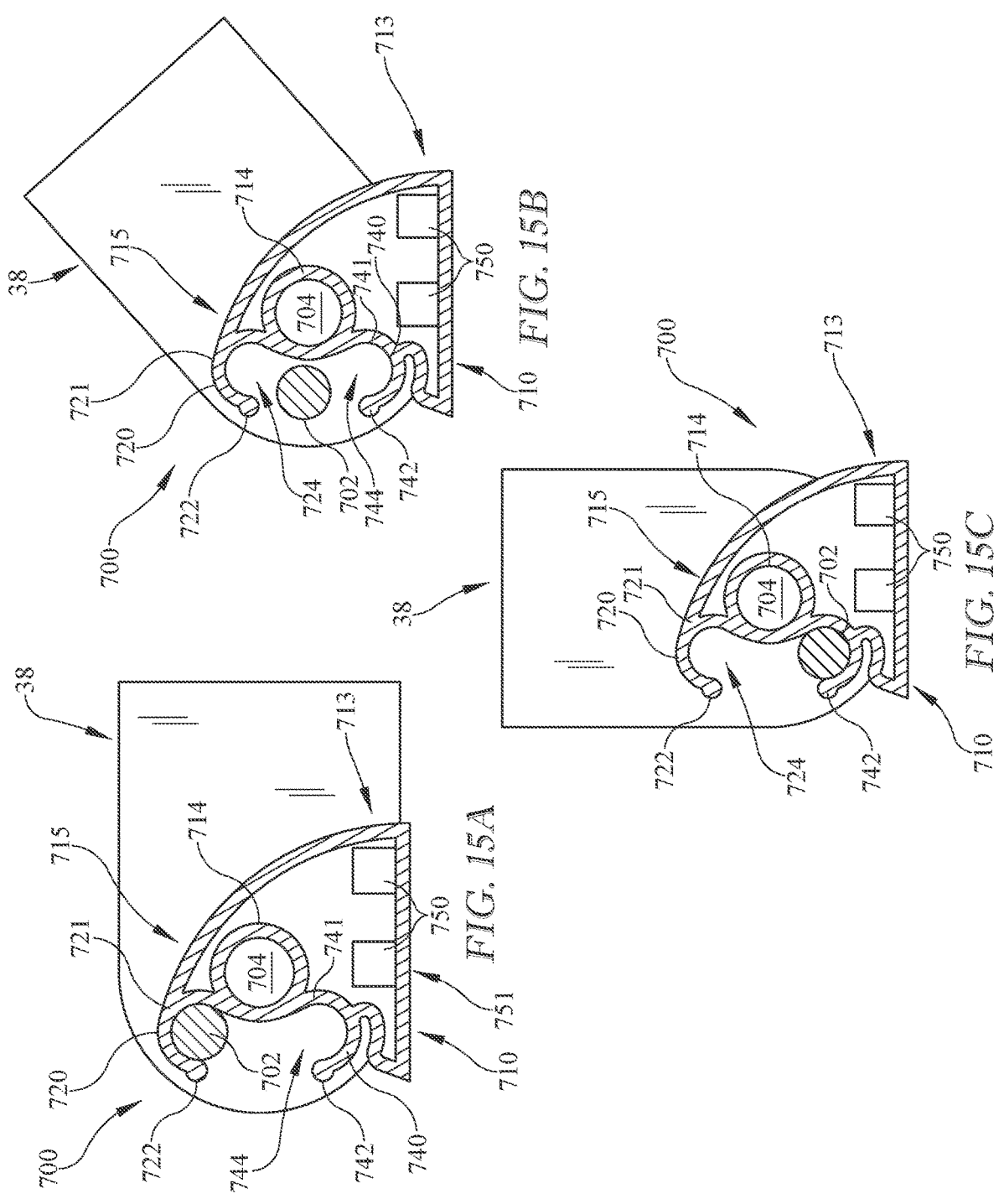
FIG. 15A is a side view of a support member operable to hold the seat bottom of the seat of the modular seat assembly of FIG. 1 in the raised and lowered arrangements according to a further aspect of the present disclosure, showing the seat bottom being held in the lowered arrangement by a resilient member.
FIG. 15B is a side view of a support member of the modular seat assembly of FIG. 15A, showing the seat bottom being moved from the lowered arrangement to the raised arrangement.
FIG. 15C is a side view of a support member of the modular seat assembly of FIG. 15A, showing the seat bottom being held in the raised arrangement by a second resilient member.

Another embodiment of a mounting assembly 700 in accordance with the present disclosure is shown in FIGS. 15A-15C. A person skilled in the art will understand that the mounting assembly 700 may be utilized with one or both of the seat assemblies 30, 42 similarly to how the mounting assemblies 100, 140, 300, 400, 500, 600 are utilized therewith, or any other seat assemblies arranged on the modular seat assembly 10. Any combination of the mounting assemblies 100, 140, 300, 400, 500, 600, 700 and the mounting assemblies described in further detail below may be utilized in the seat assemblies 30, 42. As such, the descriptions of the mounting assemblies 100, 140, 300, 400, 500, 600 are incorporated by reference to apply to the mounting assembly 700 except in instances when these descriptions conflict with the specific description and the drawings of the mounting assembly 700. Also, similar to the previous embodiments, the mounting assembly 700 may be utilized on one, multiple, or all of the lateral sides 39, 40, 51, 52 of the seat bottoms 38, 50, and as such, any reference to one of the seat bottoms 38, 50 in the description below may refer to the other seat bottom 38, 50 as well.

The mounting assembly 700 is formed similarly to the mounting assembly 500 of FIGS. 13A-13C. The two designs differ in that the first and second projections 516, 536 are instead formed as resilient catches 720, 740, and the inner flexible catches 520, 540 are no longer present. Specifically, the first support member 710 includes a bottom portion 713, a top portion 715 opposite the bottom portion 713, and a central portion 714 between the top and bottom portions 715, 713, as shown in FIGS. 15A-15C. A first resilient flexible catch 720 is arranged on the top portion 515. In the raised arrangement, the first protrusion 702 engages the first resilient flexible catch 720 so as to retain the seat bottom 38 in the raised arrangement. Similarly, a second resilient flexible catch 740 is arranged on the bottom portion 713. In the lowered arrangement, the first protrusion 702 engages the second resilient flexible catch 740 so as to retain the seat bottom 38 in the lowered arrangement.

The first resilient flexible catch 720 includes a base end 721 and a free end 722, as shown in FIGS. 15A-15C. The base end 722 is rigidly coupled to the top portion 715 of a main body portion of the first support member 710 such that the first resilient flexible catch 720 extends away from the top portion 715 and forms a U-shaped channel between the central portion 714 and the free end 722. In the raised arrangement, the free end 722 is flexed slightly away from central portion 714 by the first protrusion 702 while maintaining pressure on the first protrusion 702 such that the first protrusion 702 is securely arranged in the U-shaped channel.

Similarly, the second resilient flexible catch 740 includes a base end 741 and a free end 742, as shown in FIGS. 15A-15C. The base end 742 is rigidly coupled to the bottom portion 713 of the main body portion of the first support member 710 such that the second resilient flexible catch 740 extends away from the bottom portion 713 and forms a U-shaped channel between the central portion 714 and the free end 742. In the raised arrangement, the free end 742 is flexed slightly away from central portion 714 by the first protrusion 702 while maintaining pressure on the first protrusion 702 such that the first protrusion 702 is securely arranged in the U-shaped channel. In some embodiments, the U-shaped channels formed by the first and second resilient flexible catches 720, 740 generally match an outer contour of the first protrusion 702.

In some embodiments, the support member 710 may be coupled to the seat support platform 18 via fasteners such as bolts and screws. Other fastening means such as snap on configurations, adhesives, molding the member 710 to the seat support platform 18, and the like may be utilized.

Figures 16A, 16B, 16C:
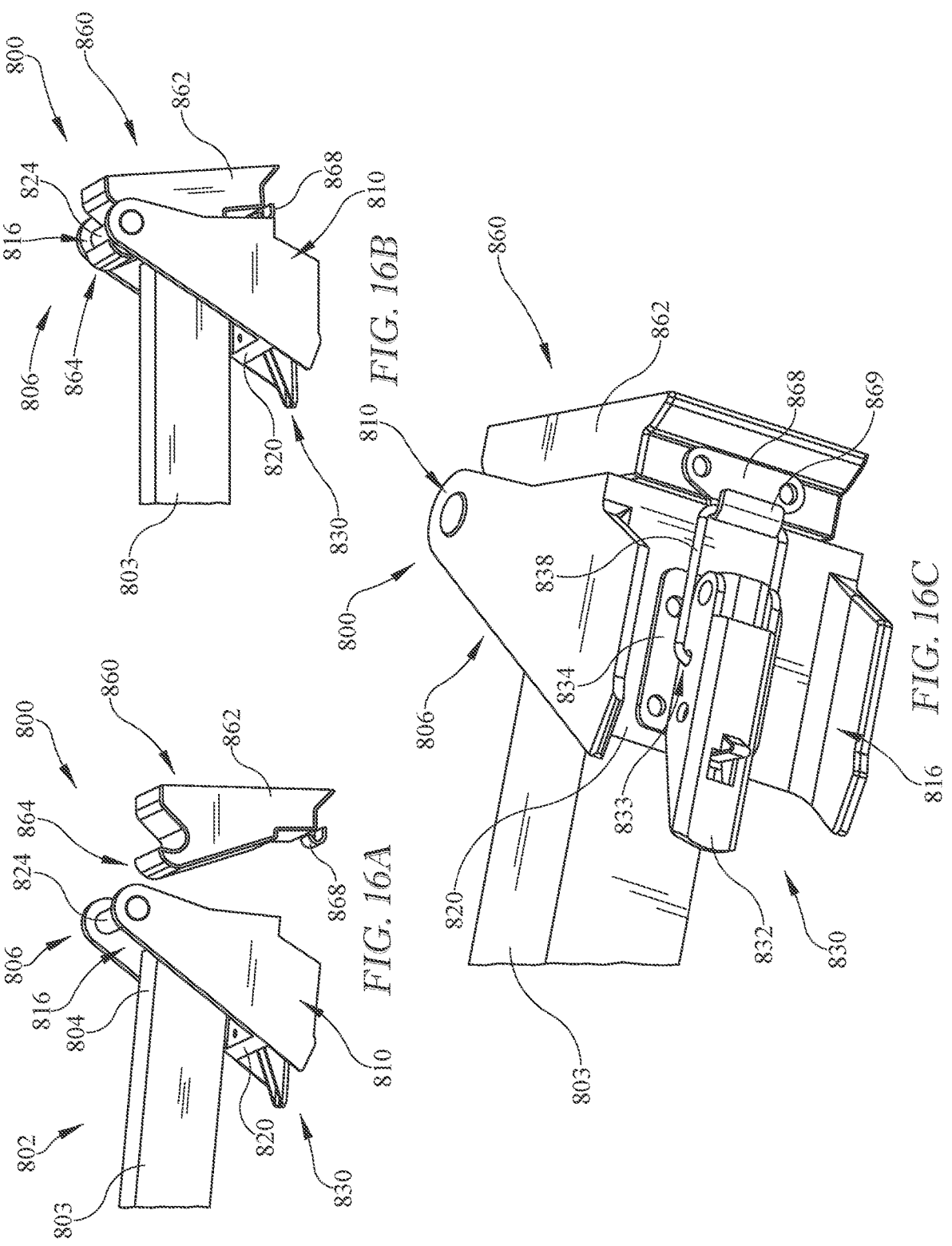
FIG. 16A is a side perspective view of a mounting member of the detachable platform operable to couple the detachable platform to a hook member arranged on the lower support frame of the modular seat assembly of FIG. 1 according to a further aspect of the present disclosure, showing the mounting member including a mounting bracket and a draw latch attachable to the hook member.
FIG. 16B is a side perspective view of the mounting member of the modular seat assembly of FIG. 16A, showing the mounting member attached to the hook member.
FIG. 16C is a lower perspective view of the mounting member of the modular seat assembly of FIG. 16A, showing the draw latch of the mounting member attached to the hook member in a mounted arrangement.

Another embodiment of a detachable platform mounting 800 in accordance with the present disclosure is shown in FIGS. 16A-16C. A person skilled in the art will understand that the mounting assembly 800 may be utilized with or in place of any of the detachable platform mounting assemblies 200, 240 described herein, and may be utilized with the detachable platform 80 similarly to how the detachable platform mounting assemblies 200, 240 are utilized therewith. Any combination of the detachable platform mounting assemblies 200, 240, 800 and the detachable platform mounting assemblies described in further detail below may be utilized with the detachable platform 80. As such, the descriptions of the detachable platform mounting assemblies 200, 240 are incorporated by reference to apply to the detachable platform mounting assembly 800 except in instances when these descriptions conflict with the specific description and the drawings of the detachable platform mounting assembly 800.

Illustratively, the detachable platform mounting assembly 800 may include a first mounting member assembly 802 having a first mounting member 803 extending away from the platform 80 and a first hook member 860 extending away from the seat support platform 18 or the lower support frame 54, as shown in FIGS. 16A-16C. The first mounting member assembly 802 includes a first mounting bracket 806 arranged on a terminal end 804 of the first mounting member 803. The first mounting bracket 806 includes a draw latch 830 arranged thereon.

In the illustrated embodiment, the first hook member 860 includes a first hook body 862, a first hook 864 arranged on a side surface of the first hook body 862 facing away from the lower support frame 54, and a first catch 868 arranged on the first hook body 862 and spaced apart from the first hook 864. In some embodiments, the first catch 868 may be located on a bottom side of the first hook body 862, and the first hook 864 may be located on a top side of the first hook body 862.

The first mounting bracket 806 includes a first bracket plate 810 extending away from the first mounting member 803 and generally aligned with a side surface of the first mounting member 803, as shown in FIGS. 16A-16C. The first bracket plate 810 may be arranged to be parallel with the side surface of the mounting member 803, but spaced apart therefrom. The first mounting bracket 806 further includes a second bracket plate 816 spaced apart and generally parallel to the first bracket plate 510 and extending away from the first mounting member 803.

The first mounting bracket 806 further includes a first rod 824 configured to engage with the first hook 864 in the mounted arrangement of the detachable platform assembly 80 so as to mount the first mounting member assembly 802 to the first hook member 860, as shown in FIGS. 16A-16C. The first rod 824 extends between the first and second bracket plates 810, 816 and is configured to securely rest in the first hook 864 when the detachable platform assembly 80 is in the mounted arrangement. The draw latch 830 is configured to releasably engage with the first catch 868 of the first hook member 860 so as to secure the first mounting member assembly 802 to the first hook member 860.

The first mounting bracket 806 includes a lower bracket platform 820 extending between lower portions of the first and second bracket plates 810, 816 beneath a lower surface of the first mounting member 803, as shown in FIGS. 16A-16C. In some embodiments, an outer end surface of the lower bracket platform 820 facing the first hook member 860 is configured to rest against an outer surface of the first hook body 862 of the first hook member 860 when the detachable platform assembly 80 is in the mounted arrangement so as to provide stabilization of the platform assembly 80 such that the platform 80 may support a load.

As can be seen in FIGS. 16A-16C, the draw latch 830 is arranged on an underside surface of the lower bracket platform 820. The draw latch 803 may include a handle 832 rotatably coupled to a base 834 that is fixed to the underside of the lower bracket platform 820. The first catch 868 of the first hook member 860 is also arranged on an underside surface of the first hook body 862 such that a latch 838 of the draw latch 830 is configured to be secured to the first catch 868 when the detachable platform assembly 80 is in the mounted arrangement. The handle 832 is configured to fixedly pivot relative to the base 834 and the latch 838 is rotatably coupled to the handle 832 at a point spaced apart from the point at which the handle 832 is fixedly and pivotably mounted to the base 834, as shown in FIG. 16C. Thus, when the handle 832 is pivoted, the latch 838 moves toward the hook member 860 so as to detach the latch 838 from the catch 868. The opposite pivoting movement of the handle 832 will pull the latch 838 away from the hook member 860 so as to secure it in the catch 868.

In exemplary embodiments, the first and second bracket plates 810, 816 are triangular, and the first rod 824 extends between first corners of the first and second bracket plates 810, 816. Attachment points of the lower bracket platform 820 on the first and second bracket plates 810, 816 are generally located adjacent to second and third corners of the triangular first and second bracket plates 810, 816, as shown in FIGS. 16A-16C. In some embodiments, the outer surface of the first hook body 862 of the first hook member 860 is sized such that, when the outer end surface of the lower bracket platform 820 rests against the outer surface of the first hook body 862 when the detachable platform assembly is in the mounted arrangement, a top surface of first mounting member 803 is generally level with a horizontal plane parallel with a plane of travel of the vehicle 1600.

Figures 17A, 17B, 17C:
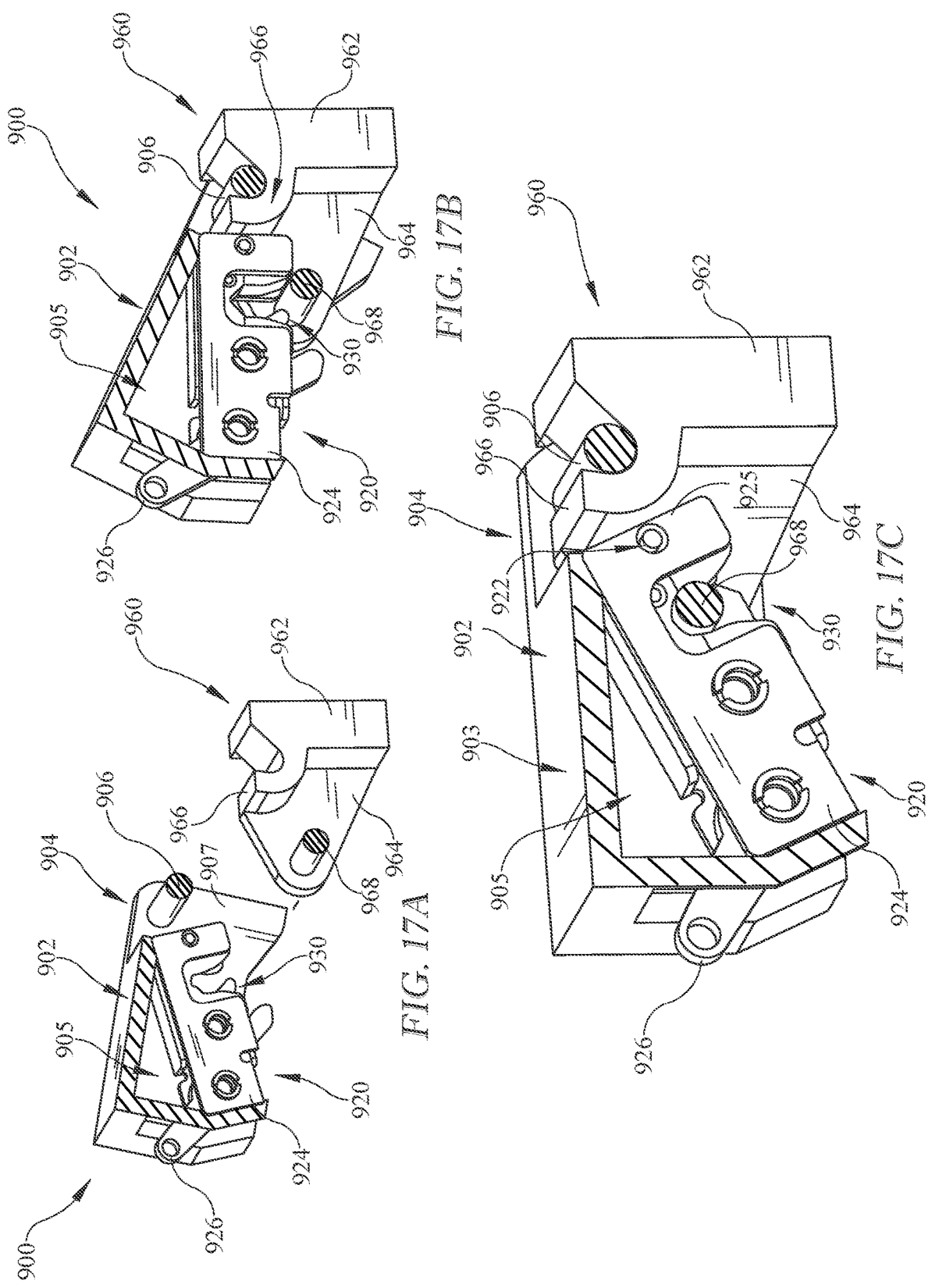
FIG. 17A is a side perspective view of a mounting member of the detachable platform operable to couple the detachable platform to a hook member arranged on the lower support frame of the modular seat assembly of FIG. 1 according to a further aspect of the present disclosure, showing the mounting member including a rotary latch attachable to the hook member.
FIG. 17B is a side perspective view of the mounting member of the modular seat assembly of FIG. 17A, showing the mounting member and the rotary latch being moved into attachment with the hook member.
FIG. 17C is a side perspective view of the mounting member of the modular seat assembly of FIG. 17A, showing the mounting member and the rotary latch attached to the hook member in a mounted arrangement.

Another embodiment of a detachable platform mounting 900 in accordance with the present disclosure is shown in FIGS. 17A-17C. A person skilled in the art will understand that the mounting assembly 900 may be utilized with or in place of any of the detachable platform mounting assemblies 200, 240, 800 described herein, and may be utilized with the detachable platform 80 similarly to how the detachable platform mounting assemblies 200, 240, 800 are utilized therewith. Any combination of the detachable platform mounting assemblies 200, 240, 800, 900 and the detachable platform mounting assemblies described in further detail below may be utilized with the detachable platform 80. As such, the descriptions of the detachable platform mounting assemblies 200, 240, 800 are incorporated by reference to apply to the detachable platform mounting assembly 900 except in instances when these descriptions conflict with the specific description and the drawings of the detachable platform mounting assembly 900.

FIGS. 17A-17C show that the detachable mounting assembly 900 includes a first mounting member 902 extending away from the platform 80 and a first hook member 960 extending away from the seat support platform 18 or the lower support frame 54. The first mounting member 902 is formed to be at least partially hollow and includes a first rotary latch 920. The first mounting member 902 includes a first side wall 904 that is generally vertical and a partial surrounding wall 903 that has a horizontal portion at the top of the first side wall 904 and a vertical portion at an end of the first side wall 904 opposite the hook member 960. The two walls 903, 904 define a hollow portion 905 of the first mounting member 902. A forward portion 907 of the first side wall 904 closest to the hook member 960 extends beyond and away from the hollow portion 905. The first mounting member 902 further includes a first protrusion 906 extending inwardly away from the first side wall 904 from the forward portion 907.

The rotary latch 920 is arranged adjacent to the first side wall 904 and within a hollow portion 905, as shown in FIGS. 17A-17C. The first rotary latch 920 is rotatably mounted to the first side wall 904 at a pivot attachment 922 so as to rotate about a pivot axis defined by the pivot attachment 922, as shown in FIG. 17C. The rotary latch 920 further includes a protrusion-receiving recess 930 formed on a lower side of the latch 920 that is configured to receive a second protrusion 968 in the mounted arrangement.

The first hook member 960 includes a first hook body 962, a first hook 966 arranged on a side surface of the first hook body 962 facing away from the lower support frame 54, a second wall 964 extending away from the first hook body 962, and the second protrusion 968 extending inwardly away from the second wall 964. In some embodiments, the second wall 964 is generally parallel with the first side wall 904 and, in the mounted arrangement, may rest adjacent to the first side wall 904, as shown in FIGS. 17B and 17C.

As can be seen in FIGS. 17A-17C, only half of the assembly 900 is shown, with cross-hatching indicating the cut-off components. Specifically, the first mounting member 902 can include another wall similar to or identical to the first side wall 904 parallel to and opposite the first side wall 904 such that the first protrusion 906 extends therebetween so as to form a clevis-like member. Similarly, the first hook member 960 can include another wall similar to or identical to the second wall 964 parallel to and opposite the second wall 964 such that the second protrusion 968 extends therebetween so as to form a clevis-like member.

In exemplary embodiments, the second wall 964 extends away from the first hook body 962 generally perpendicularly to an outer surface of the first hook body 962 that faces the first mounting member 902. The second protrusion 968 may be located at a terminal end of the second wall 964 opposite a base end of the second wall 964 coupled to the first hook body 962. In some embodiments, the second wall 964 may be triangular, and the second protrusion 968 is located at the tip of the triangle while the base of the triangle is coupled to the hook member body 962. In exemplary embodiments, the first protrusion 906 is located closer to the upper portion of the surrounding wall 903 of the first mounting member 902 than the second protrusion 968 when in the mounted arrangement.

In the mounted arrangement, the first protrusion 906 is arranged in the first hook 966 and the protrusion-receiving recess 930 of the first rotary latch 920 receives the second protrusion 968 so as to secure the first mounting member 902 to the first hook member 960, as shown in FIGS. 17B and 17C. Moreover, the pivot attachment 922 is located between the first hook 966 and the second protrusion 968, as can also be seen in FIG. 17C.

The first rotary latch 920 may further include a tab 926 arranged on a first side 924 of the first rotary latch 920 opposite a second side 925 at which the first rotary latch 920 is pivotably mounted to the first side wall 904. The tab 926 extends out of the hollow portion 905 of the first mounting member 902 and is exposed to an environment surrounding the modular seat assembly 10 for engagement by a user. The tab 926 is configured to be utilized to move the first rotary latch 920 about the pivot axis of the pivot attachment 922 and out of engagement with the second protrusion 968 so as to allow for removal of the first mounting member 902 from the first hook member 960 so as to remove the detachable platform assembly 80 from the seat frame 14.

In some embodiments, at least a portion of an inner contour of the first hook 966 generally matches an outer contour of an outer surface of the first protrusion 906. Similarly, at least a portion of an inner contour of the protrusion-receiving recess 930 generally matches an outer contour of an outer surface of the second protrusion 968.

Figures 18A, 18B, 18C:
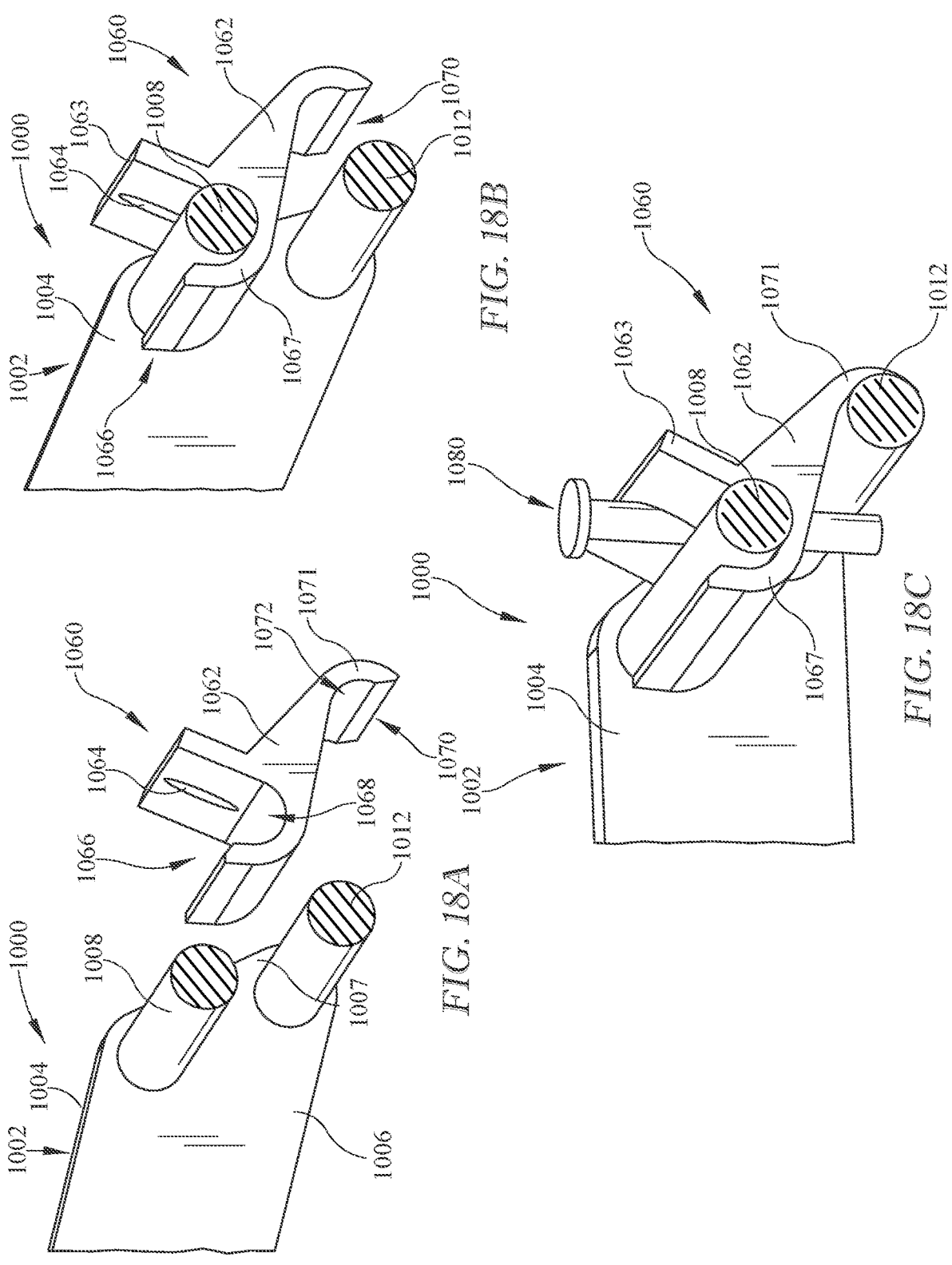
FIG. 18A is a side perspective view of a mounting member of the detachable platform operable to couple the detachable platform to a hook member arranged on the lower support frame of the modular seat assembly of FIG. 1 according to a further aspect of the present disclosure, showing the mounting member including two protrusions attachable to the hook member.
FIG. 18B is a side perspective view of the mounting member of the modular seat assembly of FIG. 18A, showing the mounting member being moved into attachment with the hook member.
FIG. 18C is a side perspective view of the mounting member of the modular seat assembly of FIG. 18A, showing the mounting member attached to the hook member with a pin therethrough in a mounted arrangement.

Another embodiment of a detachable platform mounting 1000 in accordance with the present disclosure is shown in FIGS. 18A-18C. A person skilled in the art will understand that the mounting assembly 1000 may be utilized with or in place of any of the detachable platform mounting assemblies 200, 240, 800, 900 described herein, and may be utilized with the detachable platform 80 similarly to how the detachable platform mounting assemblies 200, 240, 800, 900 are utilized therewith. Any combination of the detachable platform mounting assemblies 200, 240, 800, 900, 1000 and the detachable platform mounting assemblies described in further detail below may be utilized with the detachable platform 80. As such, the descriptions of the detachable platform mounting assemblies 200, 240, 800, 900 are incorporated by reference to apply to the detachable platform mounting assembly 1000 except in instances when these descriptions conflict with the specific description and the drawings of the detachable platform mounting assembly 1000.

The detachable platform mounting assembly 1000 includes a first mounting member 1002 extending away from the platform 80 and a first hook member 1060 extending away from the seat support platform 18 or the lower support frame 54, as shown in FIGS. 18A-18C. The first mounting member 1002 includes a first wall 1004, a first protrusion 1008 extending away from a flat surface 1006 of the first wall 1004 and a second protrusion 1012 extending away from the flat surface 1006 of the first wall 1004 and spaced apart from the first protrusion 1008. The first wall 1004 may include a slanted end edge 1007 that is angled such that the top of the edge 1007 is further from the hook member 1060 than the bottom of the edge 1007. In exemplary embodiments, the protrusions 1008, 1012 may be located equidistant from the edge 1007, as shown in FIGS. 18A and 18B. The first and second protrusions may be generally cylindrical and extend equal distances away from the first wall 1004.

As can be seen in FIGS. 18A-18C, less than the entirety of the assembly 1000 is shown, with cross-hatching indicating the cut-off components. Specifically, the first mounting member 1002 can include another wall similar to or identical to the first wall 1004 parallel to and opposite the first wall 1004 such that the protrusions 1008, 1012 extend therebetween so as to form a clevis-like member.

The first hook member 1060 includes a first hook body 1062, a first receiving means 1066 formed on an upper surface of the first hook body 1062 and a second receiving means 1070 arranged on a lower surface of the first hook body 1062, as shown in FIGS. 18A-18C. Illustratively, the first receiving means 1066 is a first recess 1068 defined by a first curved extension 1067 of the first hook body 1062. Similarly, the second receiving means 1070 is a second recess 1072 defined by a second curved extension 1071 of the first hook body 1062.

In the mounted arrangement, the first protrusion 1008 is positioned in and engaged with the first receiving means 1066, or the first recess 1068, and the second protrusion 1012 is positioned in and engaged with the second receiving means 1070, or the second recess 1072, so as to securely mount the first mounting member 1002 to the first hook member 1060. When the first protrusion 1008 is arranged in the first recess 1068, the first mounting member is rotatable about the first protrusion 1008. As such, a weight of the detachable platform assembly 80 causes a force to be applied by the second protrusion 1012 to the second recess 1072, in particular by a moment in the counterclockwise direction when viewing FIGS. 18A-18C, so as to securely mount the first mounting member 1002 to the first hook 1060.

In some embodiments, at least a portion of an inner contour of the first recess 1068 generally matches an outer contour of an outer surface of the first protrusion 1008, and at least a portion of an inner contour of the second recess 1072 generally matches an outer contour of an outer surface of the second protrusion 1012.

In exemplary embodiments, the first hook member 1060 includes a first tab member 1063 extending upwardly away from the first hook body 1062, as shown in FIGS. 18A-18C. The first tab member 1063 includes a first hole 1064 formed therethrough and the first hook body 1062 includes a second hole (not shown due to view, but formed through the center of the body 1062) that is aligned with the first hole 1064. A first pin 1080 may be arranged within the first hole 1064 and the second hole and extend between the first and second protrusions 1008, 1012 so as to secure the mounting of the first mounting member 1002 to the first hook member 1060.

Figures 19A, 19B, 19C:
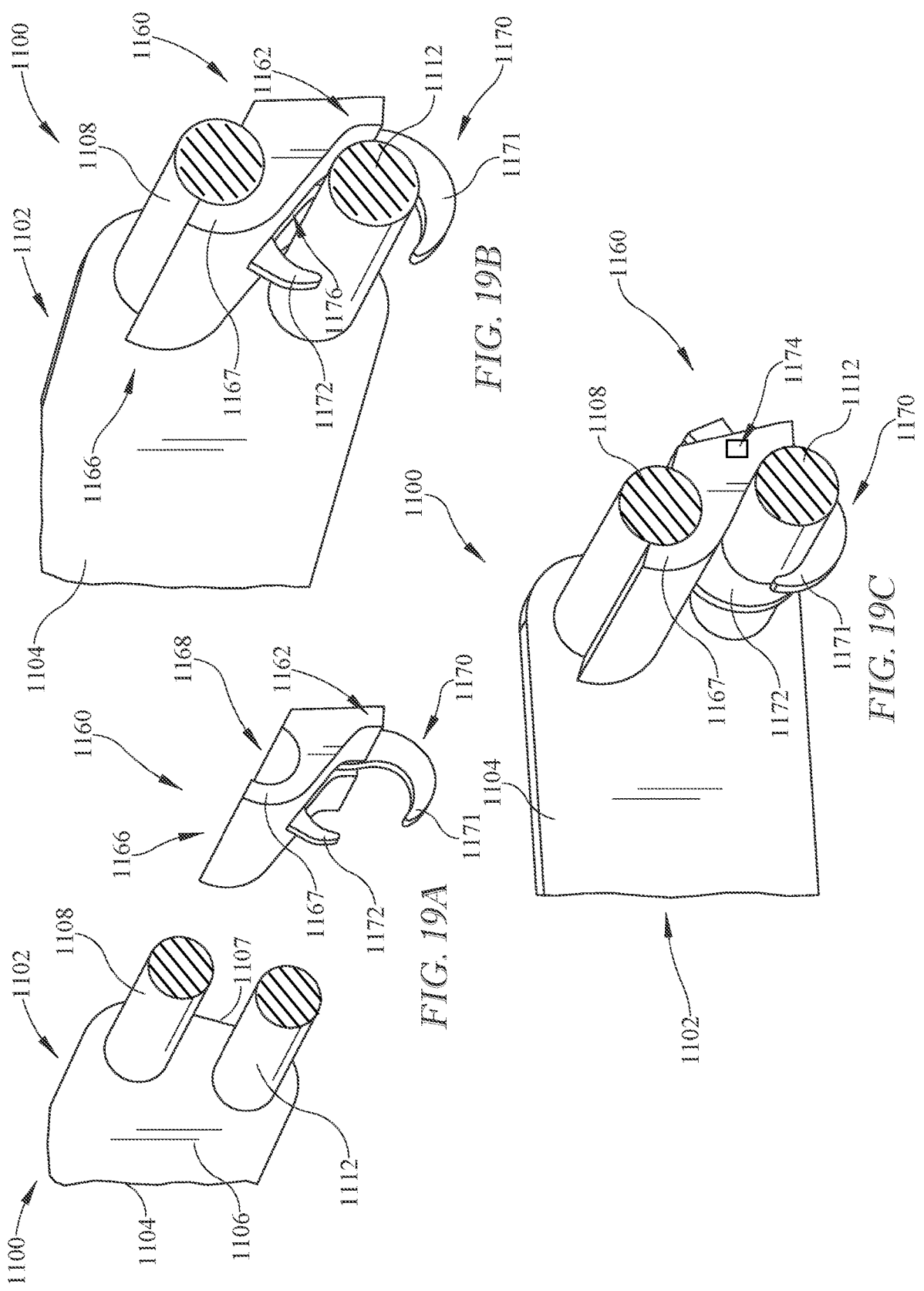
FIG. 19A is a side perspective view of a mounting member of the detachable platform operable to couple the detachable platform to a hook member arranged on the lower support frame of the modular seat assembly of FIG. 1 according to a further aspect of the present disclosure, showing the mounting member including two protrusions attachable to the hook member and the hook member including a clamp.
FIG. 19B is a side perspective view of the mounting member of the modular seat assembly of FIG. 19A, showing the mounting member being moved into attachment with the hook member.
FIG. 19C is a side perspective view of the mounting member of the modular seat assembly of FIG. 19A, showing the mounting member attached to the hook member via the clamp in a mounted arrangement.

Another embodiment of a detachable platform mounting 1100 in accordance with the present disclosure is shown in FIGS. 19A-19C. A person skilled in the art will understand that the mounting assembly 1100 may be utilized with or in place of any of the detachable platform mounting assemblies 200, 240, 800, 900, 1000 described herein, and may be utilized with the detachable platform 80 similarly to how the detachable platform mounting assemblies 200, 240, 800, 900, 1000 are utilized therewith. Any combination of the detachable platform mounting assemblies 200, 240, 800, 900, 1000, 1100 and the detachable platform mounting assemblies described in further detail below may be utilized with the detachable platform 80. As such, the descriptions of the detachable platform mounting assemblies 200, 240, 800, 900, 1000 are incorporated by reference to apply to the detachable platform mounting assembly 1100 except in instances when these descriptions conflict with the specific description and the drawings of the detachable platform mounting assembly 1100.

The detachable platform mounting assembly 1100 includes a first mounting member 1102 extending away from the platform 80 and a first hook member 1160 extending away from the seat support platform 18 or the lower support frame 54, as shown in FIGS. 19A-19C. The first mounting member 1102 includes a first wall 1104, a first protrusion 1108 extending away from a flat surface 1106 of the first wall 1104 and a second protrusion 1112 extending away from the flat surface 1106 of the first wall 1104 and spaced apart from the first protrusion 1108. The first wall 1104 may include a slanted end edge 1107 that is angled such that the top of the edge 1107 is further from the hook member 1160 than the bottom of the edge 1107. In some embodiments, the protrusions 1108, 1112 may be located equidistant from the edge 1107, as shown in FIGS. 19A and 19B. The first and second protrusions may be generally cylindrical and extend equal distances away from the first wall 1104. The first and second protrusions 1108, 1112 may be generally cylindrical and extend equal distances away from the first wall 1004.

As can be seen in FIGS. 19A-19C, less than the entirety of the assembly 1100 is shown, with cross-hatching indicating the cut-off components. Specifically, the first mounting member 1102 can include another wall similar to or identical to the first wall 1104 parallel to and opposite the first wall 1104 such that the protrusions 1108, 1112 extend therebetween so as to form a clevis-like member.

The first hook member 1160 includes a first hook body 1162, a first receiving means 1166 formed on an upper surface of the first hook body 1162 and a second receiving means 1170 arranged on a lower surface of the first hook body 1162, as shown in FIGS. 19A-19C. Illustratively, the first receiving means 1166 is a first recess 1168 defined by a first curved extension 1167 of the first hook body 1162. Unlike the embodiment of the mounting assembly 1000 described above, the second receiving means 1170 is a first clamp 1170 arranged on a lower surface of the first hook body 1162.

The first clamp 1170 includes a first jaw 1171 and a second jaw 1172 configured to move relative to each other in order to move between a locked position in which the second protrusion 1112 can be locked in place within the first clamp 1170 and an unlocked position in which the second protrusion 1112 can be removed from or is not arranged within the first clamp 1170. In the mounted arrangement, the first protrusion 1108 is positioned in the first recess 1168 and the first clamp 1170 surrounds and holds the second protrusion 1112 so as to securely mount the first mounting member 1102 to the first hook member 1160. In exemplary embodiments, the first hook member 1160 includes a release button 1174 arranged on the hook body 1162 and configured to unlock the first clamp 1170 so as to allow removal of the second protrusion 1112 from the first clamp 1170.

In order to close the clamp 1170, a user may push the jaws 1171, 1172 together, and the jaws 1171, 1172 may be held in position progressively by teeth within the hook body 1162. In some embodiments, the first hook body 1162 includes a recess 1176 within which the first and second jaws 1171, 1172 are configured to move into when moving toward the unlocked position and configured to move out of when moving toward the locked position, as shown in FIGS. 19A and 19B. The recess 1176 may include the locking teeth described above, the teeth configured to engage with complimentary locking teeth located on the first and second jaws 1171, 1172. In exemplary embodiments, the jaws 1171, 1172 can be spring loaded relative to each other such that moving the first and second jaws toward the locked position progressively locks the first and second jaws in place based on the positioning of the locking teeth.

In some embodiments, at least a portion of an inner contour of the first recess 1168 generally matches an outer contour of an outer surface of the first protrusion 1108 and at least a portion of an inner contour of the first and second jaws 1171, 1172 generally matches an outer contour of an outer surface of the second protrusion 1112.

Figures 20A, 20B, 20C:
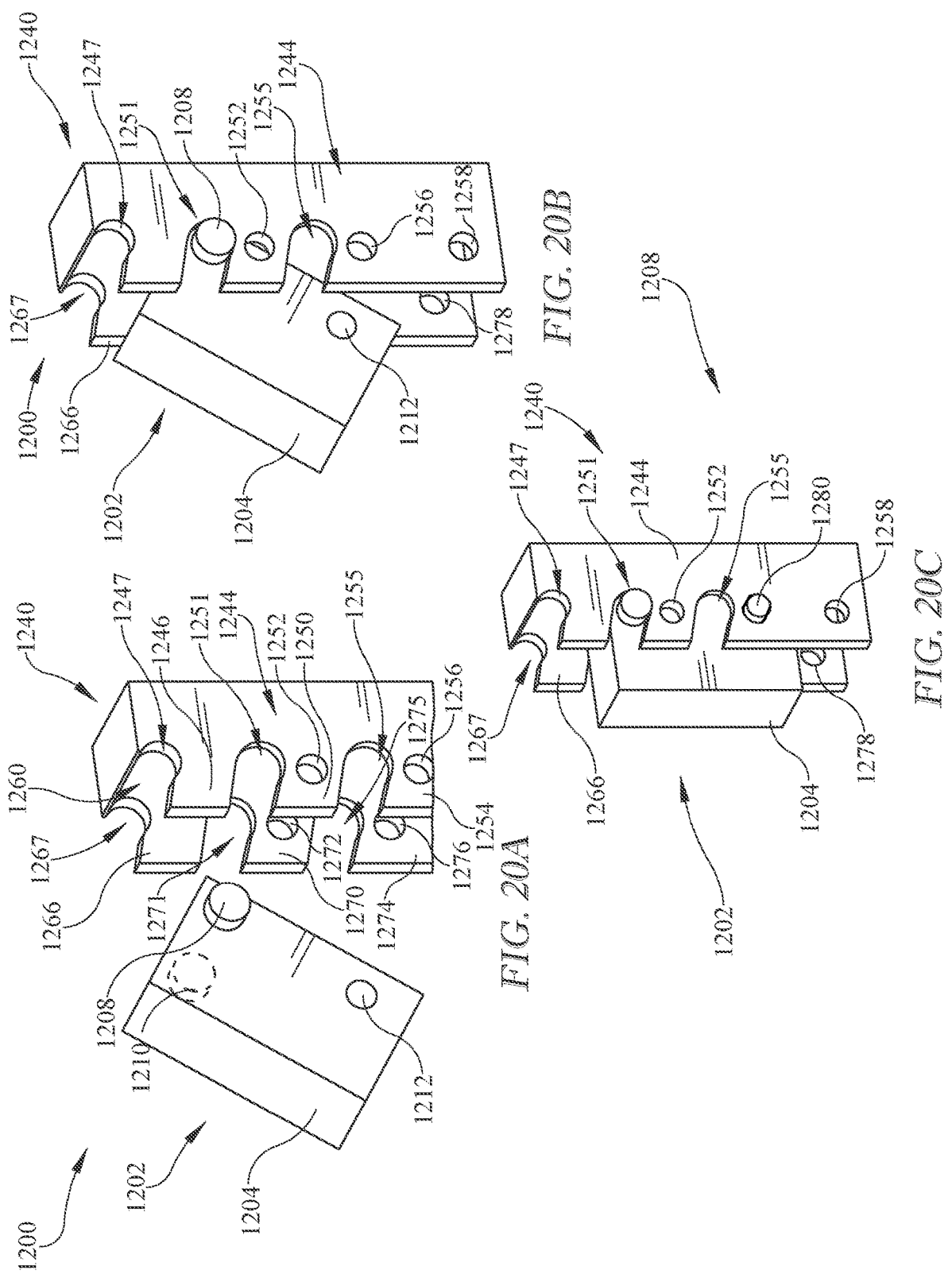
FIG. 20A is a side perspective view of a mounting member of the detachable platform operable to couple the detachable platform to a hook member arranged on the lower support frame of the modular seat assembly of FIG. 1 according to a further aspect of the present disclosure, showing the mounting member including two protrusions attachable to recesses of walls of the hook member.
FIG. 20B is a side perspective view of the mounting member of the modular seat assembly of FIG. 20A, showing the mounting member being moved into attachment with the hook member.
FIG. 20C is a side perspective view of the mounting member of the modular seat assembly of FIG. 20A, showing the mounting member attached to the hook member in a mounted arrangement.

Another embodiment of a detachable platform mounting 1200 in accordance with the present disclosure is shown in FIGS. 20A-20C. A person skilled in the art will understand that the mounting assembly 1200 may be utilized with or in place of any of the detachable platform mounting assemblies 200, 240, 800, 900, 1000, 1100 described herein, and may be utilized with the detachable platform 80 similarly to how the detachable platform mounting assemblies 200, 240, 800, 900, 1000, 1100 are utilized therewith. Any combination of the detachable platform mounting assemblies 200, 240, 800, 900, 1000, 1100, 1200 and the detachable platform mounting assemblies described in further detail below may be utilized with the detachable platform 80. As such, the descriptions of the detachable platform mounting assemblies 200, 240, 800, 900, 1000, 1100 are incorporated by reference to apply to the detachable platform mounting assembly 1200 except in instances when these descriptions conflict with the specific description and the drawings of the detachable platform mounting assembly 1200.

The detachable platform mounting assembly 1200 includes a first mounting member 1202 extending away from the platform 80 and a first hook member 1240 extending away from the seat support platform 18 or the lower support frame 54, as shown in FIGS. 20A-20C. The first mounting member 1202 includes a generally rectangular prismatic body 1204 that has a first protrusion 1208 extending away from a first side surface of the body 1204. The view of FIG. 20A shows the body 1204 as see-through such that a second protrusion 1210 (shown in phantom) can be seen extending away from a second side surface of the body 1204 opposite the first side surface. The body 1204 further includes a first hole 1212 formed therethrough from the first side surface to the second side surface. The first and second protrusions 1208, 1210 may be generally cylindrical and extend equal distances away from the first wall 1204.

Illustratively, the first hook member 1240 includes a first wall 1244 including a plurality of first recesses 1247, 1251, 1255 and a plurality of first wall holes 1252, 1256 formed therethrough. In some embodiments, the holes 1252, 1256 are formed in extensions 1250, 1254 of the wall 1244 that define the recesses 1247, 1251, 1255. The first hook member 1240 further includes a second wall 1260 spaced apart from and substantially parallel with the first wall 1244. The second wall 1260 includes at least one a plurality of second recesses 1267, 1271, 1275 and a plurality of second wall holes 1272, 1276 formed therethrough. In exemplary embodiments, the holes 1272, 1276 are formed in extensions 1270, 1274 of the wall 1260 that define the recesses 1267, 1271, 1275. A person skilled in the art will understand that, although three recesses and three holes are shown in FIGS. 20A-20C, other numbers of recesses and holes may be utilized, such as one hole per wall, two holes per wall, four holes per wall, five holes per wall, or six holes per wall. The walls can also include one recess per wall, two recesses per wall, four recesses per wall, five recesses per wall, or six recesses per wall. In some embodiments, the walls may include between 1 and 20 holes and recesses.

In some embodiments, the first and second walls 1244, 1260 are identical such that the first recess 1247, 1251, 1255 and the second recesses 1267, 1271, 1275 are aligned with each other and such that the first wall holes 1250, 1254 and the second wall holes 1270, 1274 are aligned with each other. In exemplary embodiments, at least a portion of an inner contour of the recesses 1247, 1251, 1255, 1267, 1271, 1275 generally matches an outer contour of an outer surface of the first and second protrusions 1208, 1210.

In some exemplary embodiments, the recesses 1247, 1251, 1255, 1267, 1271, 1275 are formed as U-shaped recesses, as shown in FIGS. 20A-20C. Illustratively, at least a portion of a lower straight side of the U-shaped recess is located above a lowermost point of a curved portion of the U-shaped recess such that the first or second protrusion 1208, 1210 is retained within the U-shaped recess via the at least a portion of the lower straight side of the U-shaped recess. In other words, the lower edge of each recess 1247, 1251, 1255, 1267, 1271, 1275 is slanted downwardly such that the protrusions 1208, 1210 slide downwardly and rest inside the recess.

In the mounted arrangement, the first mounting member 1202 is arranged between the first and second walls 1244, 1260 of the first hook member 1240 such that the first and second protrusions 1208, 1210 are arranged in one of the plurality of first recesses 1247, 1251, 1255 and one of the plurality of second recesses 1267, 1271, 1275, respectively. Moreover, in the mounted arrangement, the hole 1212 of the first mounting member 1202 is aligned with corresponding wall holes 1250, 1254, 1270, 1274 so as to securely mount the first mounting member 1202 to the first hook member 1240 via a first pin 1280 extending through the hole 1212 and the corresponding wall holes 1250, 1254, 1270, 1274. In some embodiments, each recess 1247, 1251, 1255, 1267, 1271, 1275 is spaced apart along a longitudinal length of the respective wall 1244, 1260 and each hole 1250, 1254, 1270, 1274 is spaced apart along the longitudinal length of the respective wall 1244, 1260 such that the first mounting member 1202 is configured to be mounted at varying height positions along the first and second walls 1244, 1260 of the first hook member 1240.

Moreover, as a result of the first mounting member 1202 being rotatable about the first and second protrusions 1208, 1210 when the first and second protrusions 1208, 1210 are arranged in recesses, a weight of the detachable platform 80 assembly causes a force to be applied to the first pin 1280 extending through the first hole 1212 and resultingly from the first pin 1280 to the first and second wall holes 1250, 1254, 1270, 1274 so as to assist in securely mounting the first mounting member 1202 to the first hook member 1240.

In exemplary embodiments, the first mounting member 1202 includes an end surface facing the first hook member 1240 and a top surface, the first protrusion 1208 and the second protrusion 1210 being arranged in the same position relative to the end surface and the top surface on the first side surface and the second side surface of the body 1204 of the mounting member 1202, as shown in FIGS. 20A-20C. The first mounting member 1202 further includes a bottom surface opposite the top surface, the first hole 1212 being spaced apart from the first and second protrusions 1208, 1210 so as to be located closer to the bottom surface than the first and second protrusions 1208, 1210.

Another embodiment of a detachable platform mounting 1300 in accordance with the present disclosure is shown in FIGS. 21A-21C. A person skilled in the art will understand that the mounting assembly 1300 may be utilized with or in place of any of the detachable platform mounting assemblies

200, 240, 800, 900, 1000, 1100, 1200 described herein, and may be utilized with the detachable platform 80 similarly to how the detachable platform mounting assemblies 200, 240, 800, 900, 1000, 1100, 1200 are utilized therewith. Any combination of the detachable platform mounting assemblies 200, 240, 800, 900, 1000, 1100, 1200, 1300 and the detachable platform mounting assemblies described in further detail below may be utilized with the detachable platform 80. As such, the descriptions of the detachable platform mounting assemblies 200, 240, 800, 900, 1000, 1100, 1200 are incorporated by reference to apply to the detachable platform mounting assembly 1300 except in instances when these descriptions conflict with the specific description and the drawings of the detachable platform mounting assembly 1300.

The detachable platform mounting assembly 1300 includes a first mounting member 1302 extending away from the platform 80 and a first hook member 1340 extending away from the seat support platform 18 or the lower support frame 54, as shown in FIGS. 21A-21C. The first mounting member 1302 includes a first body portion 1304 located on the left side of the mounting member 1302 when viewing FIGS. 21A-21C. The first body portion 1304 includes a first end surface 1306 located on a right side of the body portion 1304 facing toward the hook member 1340. The mounting member 1302 further includes a first wall 1307 extending away from a top side of the first body portion 1304 and a second wall 1312 extending downwardly away from a terminal end of the first wall 1307. The first end surface 1306, an underside of the first wall 1307, and an inner surface 1313 of the second wall 1312 facing the first end surface 1306 define a first channel 1314 therebetween. The underside of the first wall 1307 defines an innermost surface of the first channel 1314.

Illustratively, the first hook member 1340 includes a first hook body 1342 and a third wall 1344 extending upwardly away from the first hook body 1342, as shown in FIGS. 21A-21C. The third wall 1344 is configured to be received in the first channel 1314 and, in the mounted arrangement, the third wall 1344 is positioned in the first channel 1314 so as to aid in securely mounting the first mounting member 1302 to the first hook member 1340.

The hook member 1340 further includes a fourth wall 1348 extending away from the first hook body 1342 and spaced apart from the third wall 1344, as shown in FIGS. 21A-21C. The third and fourth walls 1344, 1348 define a second channel 1352 therebetween. In some embodiments, the third and fourth walls 1344, 1348 extend upwardly away from the hook body 1342 an equal distance, which may also be the same distance that the second wall 1312 extends away from the first wall 1307. The third wall 1344 may further include an angled surface 1345 that faces the first end surface 1306 and matches a corresponding angled portion of the first end surface 1306, as shown in FIG. 21C. The opposing surface of the third wall 1344 may be entirely flat so as to correspond with the surface 1313 of the second wall 1312, which may also be flat. Similarly, the fourth wall 1348 may further include an upper terminal end 1349 having an angled surface 1350 that faces the second wall 1312. The second wall 1312 may be formed with a kinked portion 1315 on the surface facing the fourth wall 1348, the kinked portion 1315 allowing for insertion of second wall 1312 into the second channel 1352 when mounting the first mounting member 1302 on the hook member 1340, as shown progressively from FIG. 21A to FIG. 21C. In some embodiments, a top surface of the first hook body 1342 that extends between the third and fourth walls 1344, 1348 defines an innermost surface of the second channel 1352.

In the mounted arrangement, as shown in FIG. 21C, a terminal end surface of the second wall 1312 contacts the innermost surface of the second channel 1352 and a terminal end surface of the third wall 1344 contacts the innermost surface of the first channel 1314.

In exemplary embodiments, an end portion 1358 of the first hook body 1342 extends away from a bottom of the third wall 1344 towards the first mounting member 1302, as shown in FIGS. 21A-21C. The first end surface 1306 of the first body portion 1304 can include a stepped portion 1359 configured to engage with the end portion 1358 of the first hook body 1342. A top inner surface of the stepped portion 1359 of the first end surface 1306 may contact and rest on the top surface of first hook body 1342 in the mounted arrangement.

In some embodiments, a first cylindrical indent 1360 is formed in the outer surface of the third wall 1344 facing the first end surface 1306, in particular on a flat portion of the outer surface of the third wall 1344 located beneath the angled surface 1345. A longitudinal extent of the first cylindrical indent 1360 extends along a width of the third wall 1344. Correspondingly, a second cylindrical indent 1362 is formed in the first end surface 1306 of the body 1304 facing the third wall 1344 such that a longitudinal extent of the second cylindrical indent 1362 extends along a width of the first end surface 1306. The first and second cylindrical indents 1360, 1362 together form a pin hole through which a pin (not shown) is configured to be inserted to assist in securely mounting the first mounting member 1302 to the first hook member 1340.

Another embodiment of a detachable platform mounting 1400 in accordance with the present disclosure is shown in FIGS. 22A-22D. A person skilled in the art will understand that the mounting assembly 1400 may be utilized with or in place of any of the detachable platform mounting assemblies 200, 240, 800, 900, 1000, 1100, 1200, 1300 described herein, and may be utilized with the detachable platform 80 similarly to how the detachable platform mounting assemblies 200, 240, 800, 900, 1000, 1100, 1200, 1300 are utilized therewith. Any combination of the detachable platform mounting assemblies 200, 240, 800, 900, 1000, 1100, 1200, 1300, 1400 and the detachable platform mounting assemblies described in further detail below may be utilized with the detachable platform 80. As such, the descriptions of the detachable platform mounting assemblies 200, 240, 800, 900, 1000, 1100, 1200, 1300 are incorporated by reference to apply to the detachable platform mounting assembly 1400 except in instances when these descriptions conflict with the specific description and the drawings of the detachable platform mounting assembly 1400.

The detachable platform mounting assembly 1400 is formed similarly to the mounting assembly 1300 described above, in particular to include a first mounting member 1402 having multiple walls extending therefrom to form a first channel and a hook member 1440 having multiple walls extending therefrom to form a second channel. In particular, the first mounting member 1402 extends away from the platform 80 and the first hook member 1440 extends away from the seat support platform 18 or the lower support frame 54, as shown in FIGS. 22A-22D. The first mounting member 1402 includes a first body portion 1404 having a first end surface 1406 facing toward the first hook member 1440 as shown in FIGS. 22A-22D, a first wall 1407 extending away from the first body portion 1404, and a second wall 1412 extending downwardly away from the first wall 1407. The first end surface 1406, the first wall 1407, and the second wall 1412 define a first channel 1414 therebetween.

The first hook member 1440 includes a first hook body 1442 and a third wall 1444 extending away from the first hook body 1442 and configured to be received in the first channel 1414, as shown in FIGS. 22B and 22C. As such, in the mounted arrangement of the detachable platform assembly 80, the third wall 1444 is positioned in the first channel 1414 so as to securely mount the first mounting member 1402 to the first hook member 1440.

In some embodiments, the first hook member 1440 includes a fourth wall 1448 extending away from the first hook body 1442 and spaced apart from the third wall 1444 away from the first end surface 1406. The third and fourth walls 1444, 1448 define a second channel 1452 therebetween. In some embodiments, the fourth wall 1448 includes an angled wall surface 1450 that extends at an angle from the first hook body 1442 and away from the second wall 1412, as viewed when the assembly 1400 is in the mounted arrangement. In one exemplary embodiment, the third and fourth walls 1444, 1448 extend away from the first hook body 1442 an equal distance, which may be the same distance that the second wall 1412 extends from the first wall 1407.

In some embodiments, the first wall 1407 defines an innermost surface of the first channel 1414, and a top surface of the first hook body 1442 that extends between the third and fourth walls 1444, 1448 defines an innermost surface of the second channel 1452. In the mounted arrangement, a terminal end surface of the second wall 1412 may contact the innermost surface of the second channel 1452 and a terminal end surface of the third wall 1444 may contact the innermost surface of the first channel 1414.

In some embodiments, an outer surface of the second wall 1412 facing the angled wall surface 1450 of the fourth wall 1448 is curved such that placement of the second wall 1412 into the second channel 1452 when mounting the detachable platform assembly 80 is unobstructed by the fourth wall 1448.

In some embodiments, the first mounting member 1402 may further include a fifth wall 1408 that extends generally perpendicularly away from the first end surface 1406 and includes a curved terminal end surface 1409. An outer surface 1445 of the first hook body 1442 facing the curved terminal end surface 1409 when in the mounted arrangement is curved as well such that placement of the third wall 1444 into the first channel 1414 when mounting the detachable platform assembly 80 is unobstructed by the fifth wall 1408. The fifth wall 1408 may also provide additional support while in the mounted arrangement.

In exemplary embodiments, an upper corner of the third wall 1444 facing an inner corner of the innermost surface of the first channel 1414 and the first end surface 1406 when in the mounted arrangement is curved, as shown in FIG. 22A. The first end surface 1406 can include a recess 1410 formed adjacent to the inner corner such that placement of the third wall 1444 into the first channel 1414 when mounting the detachable platform assembly 80 is unobstructed by the first end surface 1406. The third wall 1444 may further include an inner wall surface 1446 that faces and contacts an inner wall surface 1415 of the second wall 1412 in the mounted arrangement. In some embodiments, an entirety of the first wall surface 1446 contacts an entirety of the second wall surface 1415 in the mounted arrangement.

In exemplary embodiments, a first pin hole 1460 can be formed through the mounting member 1402 and the hook member 1440, as shown in FIG. 22D. In particular, a first hole 1462 is formed in the first wall 1407, a second hole 1464 is formed through the fifth wall 1408, and a third hole 1466 is formed through the third wall 1444 and the first hook body 1442. The first, second, and third holes 1462, 1464, 1466 are aligned with each other in the mounted arrangement such that a pin (not shown) may be inserted through the holes 1462, 1464, 1466 in the mounted arrangement to assist in securely mounting the first mounting member 1402 to the first hook member 1440.

Another embodiment of a detachable platform mounting 1500 in accordance with the present disclosure is shown in FIGS. 23A and 23B. A person skilled in the art will understand that the mounting assembly 1500 may be utilized with or in place of any of the detachable platform mounting assemblies 200, 240, 800, 900, 1000, 1100, 1200, 1300, 1400 described herein, and may be utilized with the detachable platform 80 similarly to how the detachable platform mounting assemblies 200, 240, 800, 900, 1000, 1100, 1200, 1300, 1400 are utilized therewith. Any combination of the detachable platform mounting assemblies 200, 240, 800, 900, 1000, 1100, 1200, 1300, 1400, 1500 and the detachable platform mounting assemblies described in further detail below may be utilized with the detachable platform 80. As such, the descriptions of the detachable platform mounting assemblies 200, 240, 800, 900, 1000, 1100, 1200, 1300, 1400 are incorporated by reference to apply to the detachable platform mounting assembly 1500 except in instances when these descriptions conflict with the specific description and the drawings of the detachable platform mounting assembly 1500.

The detachable platform mounting assembly 1500 is formed similarly to the mounting assemblies 1300, 1400 described above, in particular to include a first mounting member 1502 having multiple walls extending therefrom to form channels therebetween and a hook member 1540 having multiple walls configured to be inserted into those channels. In particular, the first mounting member 1502 extends away from the platform 80 and the first hook member 1440 extends away from the seat support platform 18 or the lower support frame 54, as shown in FIGS. 23A and 23B.

As can be seen in FIGS. 23A and 23B, the mounting member 1502 is shaped generally as the letter "E" is shaped when viewed from the side. Specifically, the mounting member 1502 includes a first body portion 1504 having a first end surface 1505 that is generally vertical, and then three walls extending therefrom to form the "E" shape, in particular a lower wall 1506, an upper wall 1512, and a middle wall 1518 between the upper and lower walls 1506, 1512, each of the walls being parallel with each other in some embodiments. A person skilled in the art will understand that, in other embodiments, the walls 1506, 1512, 1518 may not be parallel while still allowing for the mounting member 1502 to be securely mounted on the hook member 1540. The walls 1506, 1512, 1518 may form large channels 1510, 1516 therebetween, as shown in FIG. 23A.

As shown in FIGS. 23A and 23B, the hook member 1540 may include a longitudinal extent that extends generally parallel with the first end surface 1505 of the first body portion 1504 and has a first hook body 1542 that is located generally centrally relative to the wall 1518. A further wall 1544 extends generally perpendicularly upwardly away from the first hook body 1542 and includes a sloped wall surface 1558 facing away from the first end surface 1505. The first hook member 1540 includes a further wall 1552 extending away from the first hook body 1542 generally perpendicularly to the wall 1544. In some embodiments, the second wall 1512 includes a sloped wall surface 1513 on an end portion 1514 of the wall 1512, the surface 1513 facing toward the first end surface 1505 of the first body portion 1504. The sloped wall surface 1513 of the second wall 1512 and the sloped wall surface 1558 of the third wall 1544 are generally parallel within 20 degrees of each other. In other embodiments, the angle may be between 10 degrees and 30 degrees. In some embodiments, the two surfaces 1513, 1558 may be parallel. In exemplary embodiments, at least a portion of the sloped wall surface 1513 rests on the sloped wall surface 1558 when in the mounted arrangement, as shown in FIG. 23B.

When in the mounted arrangement, at least a portion of a lower wall surface of the middle wall 1518 may rest on an upper wall surface of the wall 1552. Moreover, in some embodiments, the first hook member 1542 may include an additional wall 1548 extending downwardly away from the hook body 1542 generally parallel with the longitudinal extent of the first hook member 1540. The lower wall 1506 of the first mounting member 1502 may be sized so as to extend beneath the additional wall 1548 when in the mounted arrangement, as shown in FIG. 23B.

In some embodiments, the bottom wall 1506 includes a main body portion 1507 and a stepped end portion 1508, as shown in FIGS. 23A and 23B. A first width of the main body portion 1507 as measured from an upper surface to an opposing lower surface of the main body portion 1507 may be greater than a second width of the stepped end portion 1508 as measured from an upper surface to an opposing lower surface of the stepped end portion 1508. The lower wall 1548 of the first hook member 1540 may be sized to extend to and contact the upper surface of the stepped end portion 1508 when in the mounted arrangement. In some embodiments, a terminal end 1509 of the stepped end portion 1508 includes a slope such that placement of the first mounting member 1502 on the first hook member 1540 when mounting the detachable platform assembly 80 is unobstructed by the walls 1506, 1548.

It is to be understood that while the invention has been described in this document with respect to a specific but illustrative embodiment, various configurational and size changes may be made within the scope of the invention described and claimed herein. The drawings, although not fully dimensioned, are to scale.

The invention claimed is:

1. A modular seat assembly for attachment to a vehicle, comprising:

a seat frame operable to be attached to the vehicle, the seat frame including a seat support platform;

at least one seat assembly arranged on the seat frame, the at least one seat assembly including a seat back coupled to the seat frame and a seat bottom pivotably coupled to the seat support platform; and a first mounting assembly including a first support member coupled to the seat support platform adjacent to an inner side of the seat platform and a first protrusion extending away from a first lateral side of the seat bottom, wherein the seat bottom is coupled to and is pivotable about the first support member between a raised arrangement and a lowered arrangement, and wherein the first support member includes a first resilient recess, wherein the first resilient recess is operable to receive the first protrusion when the seat bottom is in the raised arrangement so as to retain the seat bottom in the raised arrangement, and wherein the first protrusion is arranged outside of the first resilient recess when the seat bottom is in the lowered arrangement.

2. The modular seat assembly of claim 1, further comprising:

a second mounting assembly including a second support member spaced apart from the first support member and coupled to the seat support platform adjacent to the inner side of the seat support platform, wherein the first support member is arranged adjacent to the first lateral side of the seat bottom, and wherein the second support member is arranged adjacent to a second lateral side of the seat bottom opposite the first lateral side.

3. The modular seat assembly of claim 2, wherein the second mounting assembly further includes a second protrusion extending away from the second lateral side of the seat bottom, and wherein the second support member includes a second resilient recess operable to receive the second protrusion when the seat bottom is in the raised arrangement so as to retain the seat bottom in the raised arrangement.

4. The modular seat assembly of claim 3, wherein the first and second resilient recesses of the first and second support members are arranged on a bottom side of the first and second support members.

5. The modular seat assembly of claim 4, wherein the first and second resilient recesses are formed as U-shaped channels, and wherein the U-shaped channels are formed between a free end of the first and second support member, respectively, and an inwardly-facing side of a main body portion of the first and second support members, respectively.

6. The modular seat assembly of claim 5, wherein, in the raised arrangement in which the first and second protrusions are arranged in the first and second resilient recesses, respectively, the free end of the first and second support members are flexed slightly away from the main body portions by the first and second protrusions while maintaining pressure on the first and second protrusions such that the first and second protrusions are securely arranged in the first and second resilient recesses, respectively.

7. The modular seat assembly of claim 5, wherein the U-shaped channels of the first and second resilient recesses generally match an outer contour of the first and second protrusions, respectively.

8. The modular seat assembly of claim 1, wherein, in the raised arrangement, the seat bottom is raised toward the seat back, and wherein, in the lowered arrangement, the seat bottom is substantially parallel with the seat support platform.

9. The modular seat assembly of claim 1, wherein the seat support platform includes a seat support surface and a lower support surface opposite the seat support surface, and wherein a lower support frame is coupled to and depends downwardly away from the lower support surface of the seat support platform.

10. The modular seat assembly of claim 3, further comprising:

a first coupling protrusion extending away from the first lateral side of the seat bottom and a second coupling protrusion extending away from the second lateral side of the seat bottom, wherein the first support member includes a first opening formed therethrough, wherein the second support member includes a second opening formed therethrough, wherein the first coupling protrusion is arranged within the first opening and the second coupling protrusion is arranged within the second opening, wherein the first and second openings define a pivot axis of the seat bottom, and wherein the first and second coupling protrusions are rotatably movable within the first and second openings such that the seat bottom is operable to freely pivot about the pivot axis.

11. The modular seat assembly of claim 10, wherein the first protrusion is spaced apart from the first coupling protrusion on the first lateral side of the seat bottom, wherein the second protrusion is spaced apart from the second coupling protrusion on the second lateral side of the seat bottom, and wherein the first and second protrusions are arranged on the first and second lateral sides radially outwardly of the pivot axis such that the first and second protrusions travel along first and second circumferential paths about the pivot axis in response to the seat bottom moving between the raised and lowered arrangements.

12. A modular seat assembly for attachment to a vehicle, comprising:

a seat frame operable to be attached to the vehicle, the seat frame including a seat support platform;

at least one seat assembly arranged on the seat frame, the at least one seat assembly including a seat back coupled to the seat frame and a seat bottom pivotably coupled to the seat support platform;

a first mounting assembly including a first support member coupled to the seat support platform adjacent to an inner side of the seat platform and a first protrusion extending away from a first lateral side of the seat bottom, wherein the seat bottom is coupled to and is pivotable about the first support member between a raised arrangement and a lowered arrangement, and wherein the first support member includes a first resilient flexible catch operable to receive the first protrusion when the seat bottom is in the lowered arrangement so as to retain the seat bottom in the lowered arrangement; and a second mounting assembly including a second support member spaced apart from the first support member and coupled to the seat support platform adjacent to the inner side of the seat support platform, wherein the first support member is arranged adjacent to the first lateral side of the seat bottom, and wherein the second support member is arranged adjacent to a second lateral side of the seat bottom opposite the first lateral side; and wherein the second mounting assembly further includes a second protrusion extending away from the second lateral side of the seat bottom, and wherein the second support member includes a second resilient flexible catch operable to receive the second protrusion when the seat bottom is in the raised arrangement so as to retain the seat bottom in the raised arrangement, wherein the first resilient flexible catch of the first support member is arranged on a top side of the first support member, and wherein the first resilient flexible catch includes a base end and a free end, and wherein the base end is rigidly coupled to a main body portion of the first support member adjacent to the top side such that the first resilient flexible catch extends away from the main body portion and forms a U-shaped channel between the main body portion and the free end.

13. The modular seat assembly of claim 12, wherein, in the lowered arrangement in which the first protrusion is arranged in the U-shaped channel formed by the first resilient flexible catch, the free end of the first resilient flexible catch is flexed slightly away from main body portion by the first protrusion while maintaining pressure on the first protrusion such that the first protrusion is securely arranged in the U-shaped channel.

14. The modular seat assembly of claim 13, wherein the second resilient flexible catch of the second support member is arranged on a bottom side of the second support member.

15. The modular seat assembly of claim 14, wherein the second resilient flexible catch includes a base end and a free end, and wherein the base end is rigidly coupled to a main body portion of the second support member adjacent to the bottom side such that the second resilient flexible catch extends away from the main body portion and forms a U-shaped channel between the main body portion and the free end.

16. A modular seat assembly for attachment to a vehicle, comprising:

a seat frame operable to be attached to the vehicle, the seat frame including a seat support platform;

at least one seat assembly arranged on the seat frame, the at least one seat assembly including a seat back coupled to the seat frame and a seat bottom pivotably coupled to the seat support platform; and a first mounting assembly including a first support member coupled to the seat support platform adjacent to an inner side of the seat platform and a first protrusion extending away from a first lateral side of the seat bottom, wherein the seat bottom is coupled to and is pivotable about the first support member between a raised arrangement and a lowered arrangement, and wherein the first support member includes a first resilient recess, wherein the first resilient recess is operable to receive the first protrusion when the seat bottom is in the raised arrangement so as to retain the seat bottom in the raised arrangement, wherein the first resilient recess is formed as a U-shaped channel, and wherein the U-shaped channel is formed between a free end of the first support member and an inwardly-facing side of a main body portion of the first support member.

17. The modular seat assembly of claim 16, further comprising:

a second mounting assembly including a second support member spaced apart from the first support member and coupled to the seat support platform adjacent to the inner side of the seat support platform, wherein the first support member is arranged adjacent to the first lateral side of the seat bottom, and wherein the second support member is arranged adjacent to a second lateral side of the seat bottom opposite the first lateral side.

18. The modular seat assembly of claim 17, wherein the second mounting assembly further includes a second protrusion extending away from the second lateral side of the seat bottom, and wherein the second support member includes a second resilient recess operable to receive the second protrusion when the seat bottom is in the raised arrangement so as to retain the seat bottom in the raised arrangement.

19. The modular seat assembly of claim 18, wherein the first and second resilient recesses of the first and second support members are arranged on a bottom side of the first and second support members.

* * * * *